(12) United States Patent
Sharrah et al.

(10) Patent No.: US 11,162,649 B1
(45) Date of Patent: Nov. 2, 2021

(54) PORTABLE LIGHT HAVING A MOVABLE HEAD AND/OR A MOVABLE HANDLE

(71) Applicant: STREAMLIGHT, INC., Eagleville, PA (US)

(72) Inventors: Raymond L. Sharrah, Collegeville, PA (US); Joshua Hawk, Limerick, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 17/168,538

(22) Filed: Feb. 5, 2021

(51) Int. Cl.
*F21L 4/04* (2006.01)
*F21L 4/02* (2006.01)
*F21V 21/14* (2006.01)
*F21V 21/40* (2006.01)
*F21V 23/04* (2006.01)
(Continued)

(52) U.S. Cl.
CPC .............. *F21L 4/045* (2013.01); *F21L 4/027* (2013.01); *F21V 21/145* (2013.01); *F21V 21/406* (2013.01); *F21V 23/0414* (2013.01); *B60Q 3/35* (2017.02); *F16B 45/02* (2013.01); *F21L 4/04* (2013.01); *F21V 21/40* (2013.01); *F21V 23/0421* (2013.01); *F21V 23/0428* (2013.01)

(58) Field of Classification Search
CPC ........ F21V 21/145; F21V 21/26; F21V 21/28; F21V 21/30; F21V 21/40; F21V 21/406; F21V 23/0414; F21V 23/0421; F21V 23/0428; F21L 4/04; F21L 4/045; F16B 45/02; B60Q 3/35
See application file for complete search history.

(56) References Cited

U.S. PATENT DOCUMENTS 2,267,895 A * 12/1941 Boynton ................. F21V 23/04
362/234
3,053,978 A * 9/1962 Rhoades .................. F21L 4/00
362/184
3,944,805 A 3/1976 Moore
(Continued)

FOREIGN PATENT DOCUMENTS

GB 785123 A * 10/1957 ............. B64D 47/02

OTHER PUBLICATIONS

Streamlight, Inc., "C4 LED—615 Lumen Rechargeable LED Flood Lantern", Product Specifications, 2 pages, date prior to Sep. 26, 2017, www.streamlight.com.
(Continued)

*Primary Examiner* — Alexander K Garlen
*Assistant Examiner* — Colin J Cattanach
(74) *Attorney, Agent, or Firm* — Clement A. Berard, Esq.; Dann, Dorfman, Herrell & Skillman, PC

(57) ABSTRACT

A portable light may comprise: a light body for receiving a source of electrical power; a light source for producing light when energized; and a switch assembly for selectively coupling the source of electrical power with said light source for energizing the light source to produce light. The portable light may have a light head and a pivot assembly including a pivotable joint for pivoting the light head towards and away from the light body and a rotatable joint for rotating the light head relative to the light body; and/or may have a handle assembly coupled to the light body by a handle pivot so as to be pivotable away from and toward the light body. A releasable latch assembly that retains the handle housing adjacent the light body may be provided.

27 Claims, 20 Drawing Sheets

(51) Int. Cl.
*B60Q 3/35* (2017.01)
*F16B 45/02* (2006.01)

(56) References Cited

U.S. PATENT DOCUMENTS

| | | | |
|---|---|---|---|
| 4,533,982 A | 8/1985 | Kozar | |
| 5,270,909 A * | 12/1993 | Weiss | A47G 19/22 |
| | | | 16/110.1 |
| 5,432,689 A | 7/1995 | Sharrah et al. | |
| 5,629,105 A | 5/1997 | Matthews | |
| 6,313,604 B1 | 11/2001 | Chen | |
| 6,913,370 B2 | 7/2005 | Ping | |
| 7,059,744 B2 | 6/2006 | Sharrah | |
| 7,126,484 B1 * | 10/2006 | Luquire | B26B 1/10 |
| | | | 340/574 |
| 7,481,551 B2 | 1/2009 | Sharrah | |
| 7,652,216 B2 | 1/2010 | Sharrah et al. | |
| 7,674,003 B2 | 3/2010 | Sharrah et al. | |
| 7,880,100 B2 | 2/2011 | Sharrah et al. | |
| 8,110,760 B2 | 2/2012 | Sharrah et al. | |
| 8,235,552 B1 | 8/2012 | Tsuge | |
| 8,258,416 B2 | 9/2012 | Sharrah et al. | |
| 8,400,109 B2 | 3/2013 | Wang | |
| 8,575,893 B2 | 11/2013 | Devaney | |
| 8,777,446 B2 | 7/2014 | Sharrah et al. | |
| 9,010,279 B1 * | 4/2015 | Saber | A01K 27/003 |
| | | | 119/795 |
| 9,470,382 B1 | 10/2016 | Sharrah et al. | |
| 10,240,729 B1 | 3/2019 | Worman et al. | |
| 10,365,069 B1 * | 7/2019 | Tayon | F41G 11/003 |
| 10,393,328 B2 | 8/2019 | Worman et al. | |
| 10,429,013 B1 * | 10/2019 | Fang | F21L 4/04 |
| 10,767,820 B2 | 9/2020 | Worman et al. | |
| 10,928,051 B1 | 2/2021 | Worman | |
| 10,948,139 B2 | 3/2021 | McLennan | |
| 2004/0052073 A1 * | 3/2004 | Chang | F21V 21/406 |
| | | | 362/197 |
| 2005/0007769 A1 * | 1/2005 | Bonzer | F21L 4/08 |
| | | | 362/157 |
| 2008/0030977 A1 | 2/2008 | Bobbin | |
| 2008/0120817 A1 * | 5/2008 | Lin | G10K 5/00 |
| | | | 24/598.1 |
| 2008/0225518 A1 * | 9/2008 | Devaney | F21L 4/04 |
| | | | 362/197 |
| 2009/0190332 A1 | 7/2009 | Sharrah | |
| 2012/0033415 A1 | 2/2012 | Sharrah et al. | |
| 2012/0057335 A1 * | 3/2012 | Wang | F21L 4/045 |
| | | | 362/197 |
| 2012/0062178 A1 | 3/2012 | Wang | |
| 2013/0220063 A1 | 8/2013 | Mori | |
| 2014/0197781 A1 | 7/2014 | Maglica | |
| 2014/0268696 A1 * | 9/2014 | Waters | F21V 23/04 |
| | | | 362/157 |
| 2015/0001056 A1 | 1/2015 | Colonna | |
| 2015/0192243 A1 * | 7/2015 | Sharrah | F21L 4/00 |
| | | | 362/190 |
| 2015/0219292 A1 | 8/2015 | Ross | |
| 2016/0018071 A1 | 1/2016 | Sharrah | |
| 2017/0284646 A1 | 10/2017 | Arena et al. | |
| 2019/0285251 A1 * | 9/2019 | Li | F21V 21/40 |
| 2019/0285257 A1 * | 9/2019 | Gall | F21V 21/145 |
| 2020/0378586 A1 * | 12/2020 | Harvey | F21L 4/04 |
| 2021/0033248 A1 * | 2/2021 | Cacciabeve | F21L 4/04 |

OTHER PUBLICATIONS

Streamlight, Inc., "C4 LED—540 Lumen Rechargeable Spot Beam Lantern", Product Specifications, 2 pages, date prior to Sep. 26, 2017, www.streamlight.com.
Streamlight, Inc., "C4 LED—Rechargeable Firefighting LED Lantern", Product Specifications, 2 pages, date prior to Sep. 26, 2017, www.streamlight.com.
Streamlight, Inc., "C4 LED—ATEX Rated, Industrial and Fire Carry Lantern", Product Specifications, 2 pages, date prior to Sep. 26, 2017, www.streamlight.com.
Streamlight, Inc., "Vulcan LED—ATEX Rated Rechargeable Lantern", Data Sheet, 1 page, dated Apr. 2016, www.streamlight.com.
Streamlight, Inc., "Fire Vulcan—Rechargeable LED Lantern", Data Sheet, 1 page, dated Mar. 2016, www.streamlight.com.
Streamlight, Inc., "Fire Vulcan—LED Rechargeable Lantern", Data Sheet, 2 pages, dated Apr. 2017, www.streamlight.com.
International Searching Authority, "PCT—International Search Report & Written Opinion", PCT/US2018/046225, dated Oct. 26, 2018, 11 pages.
Streamlight, Inc., "Knucklehead—Division 2 Worklight", Data Sheet, 2 pages, dated Jun. 2020, www.streamlight.com.
Streamlight, Inc., "Vulcan 180—Multifunction, Rechargeable Lantern", Data Sheet, 1 page, dated Apr. 2020, www.streamlight.com.
Streamlight, Inc., "E-Flood LiteBox HL—High Lumen Lantern", Data Sheet, 2 pages, dated Sep. 2016, www.streamlight.com.
Streamlight, Inc., "LiteBox / FireBox / E-Flood / E-Spot—Rechargeable", Operating Instructions Rev E, 2 pages, dated Dec. 2011, www.streamlight.com.

* cited by examiner

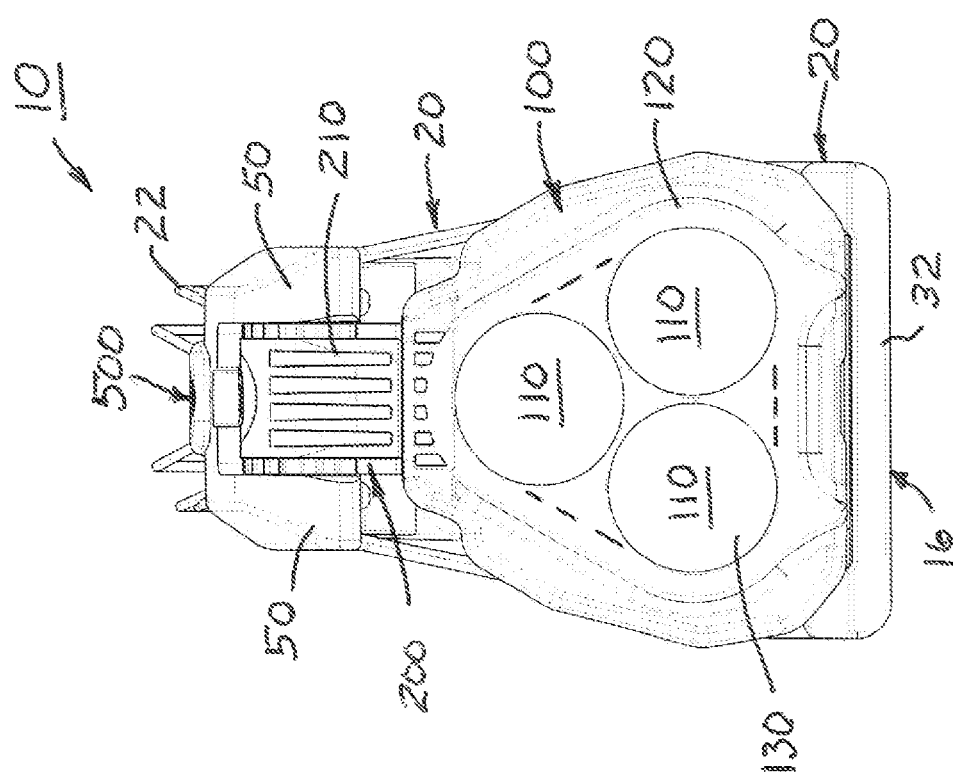

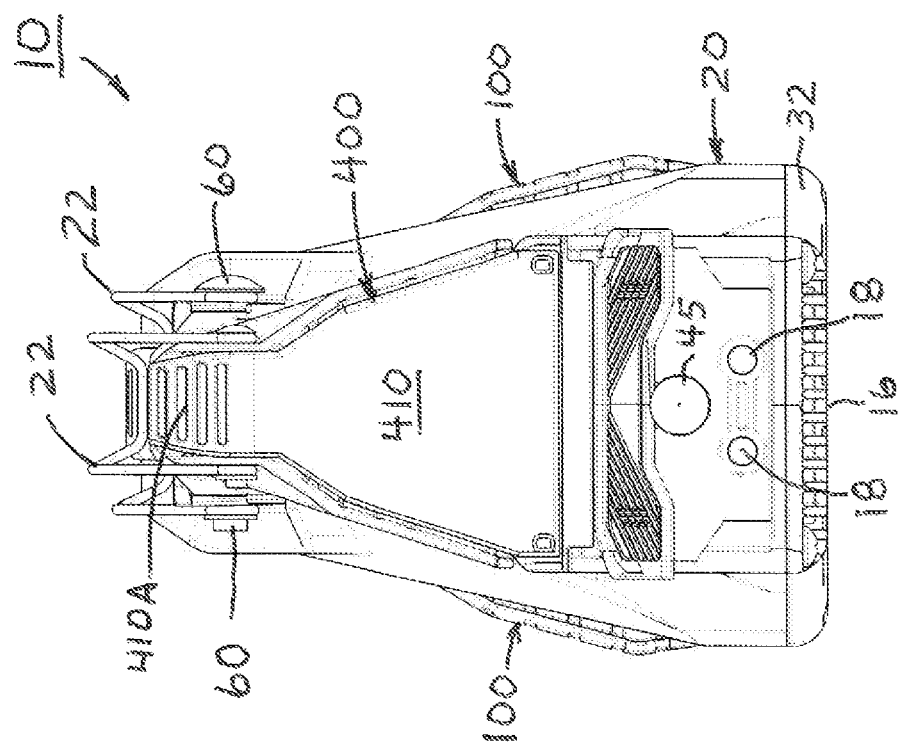

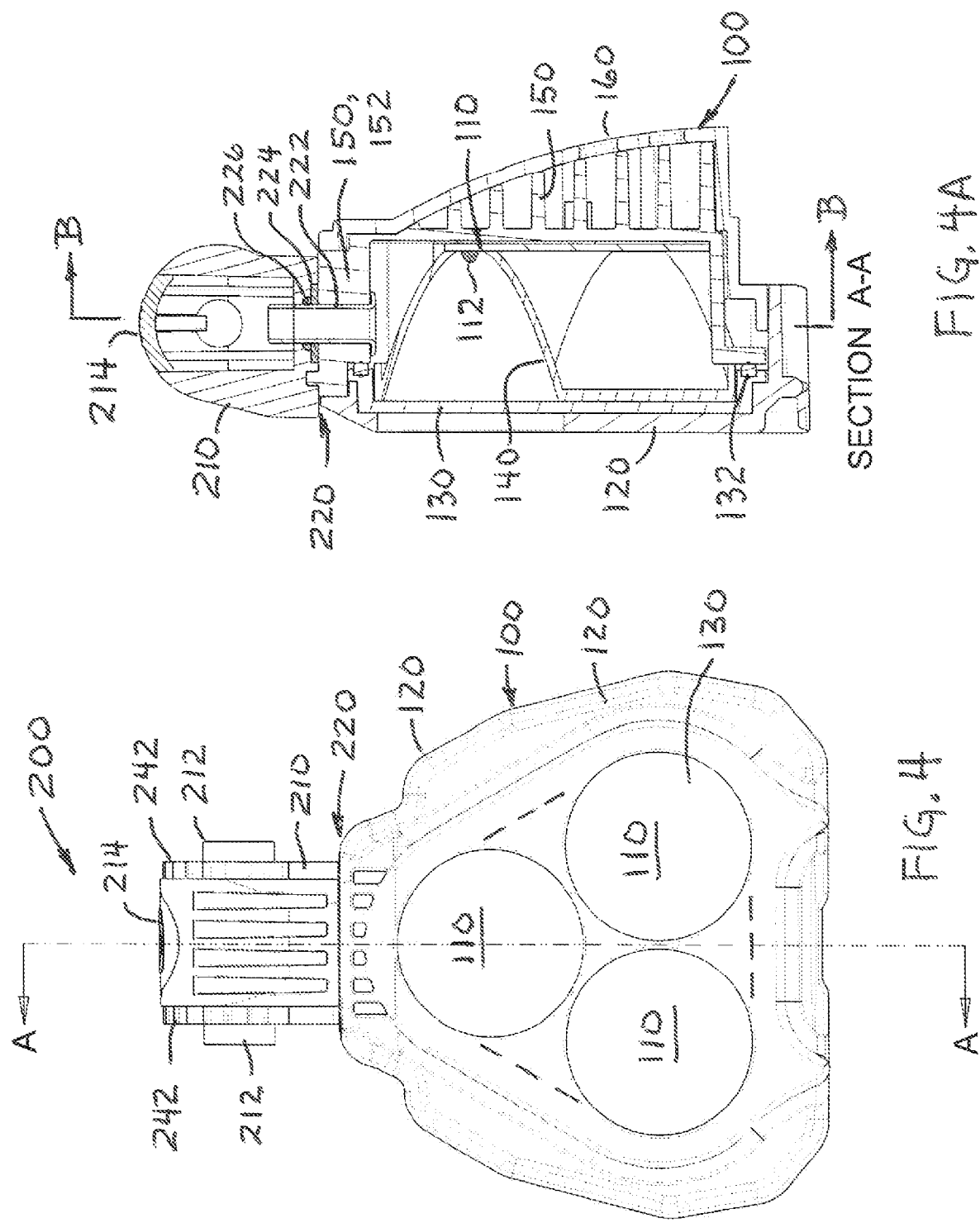

SECTION B-B

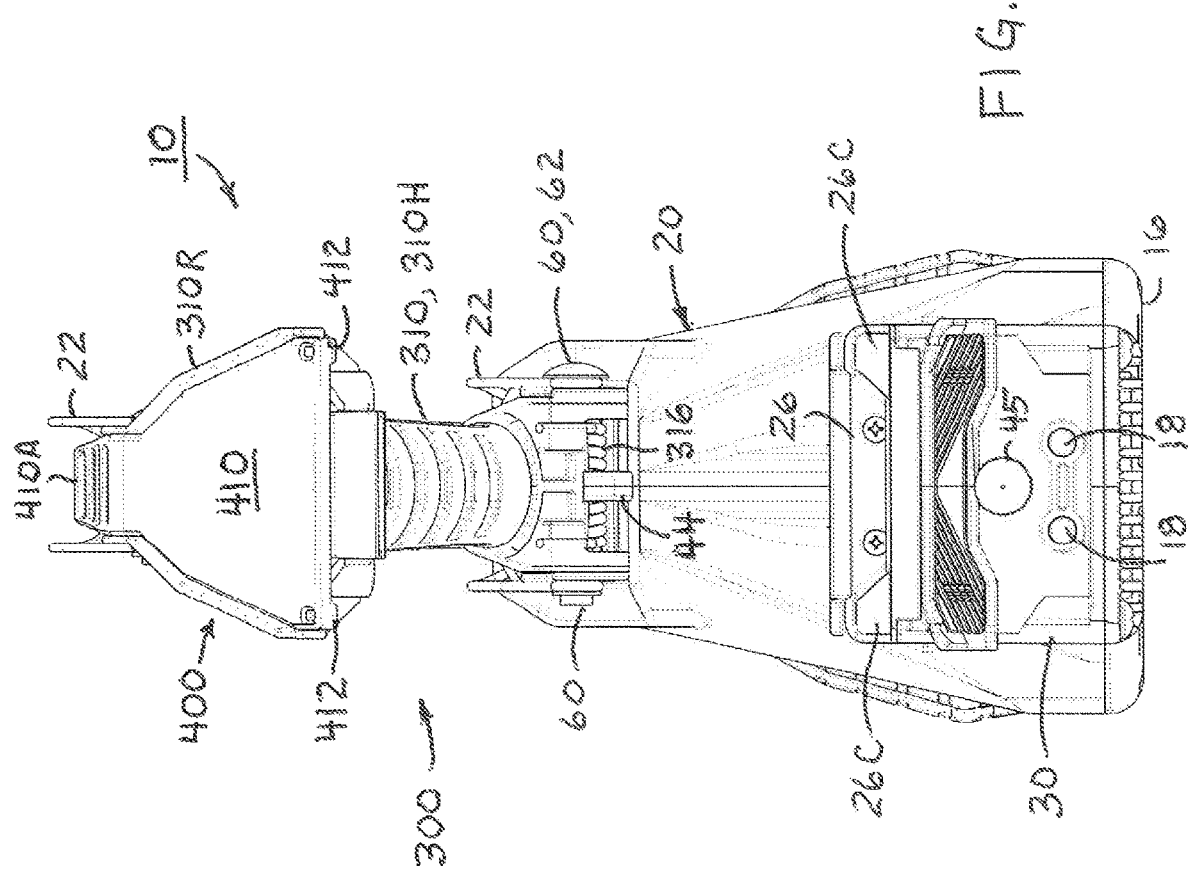

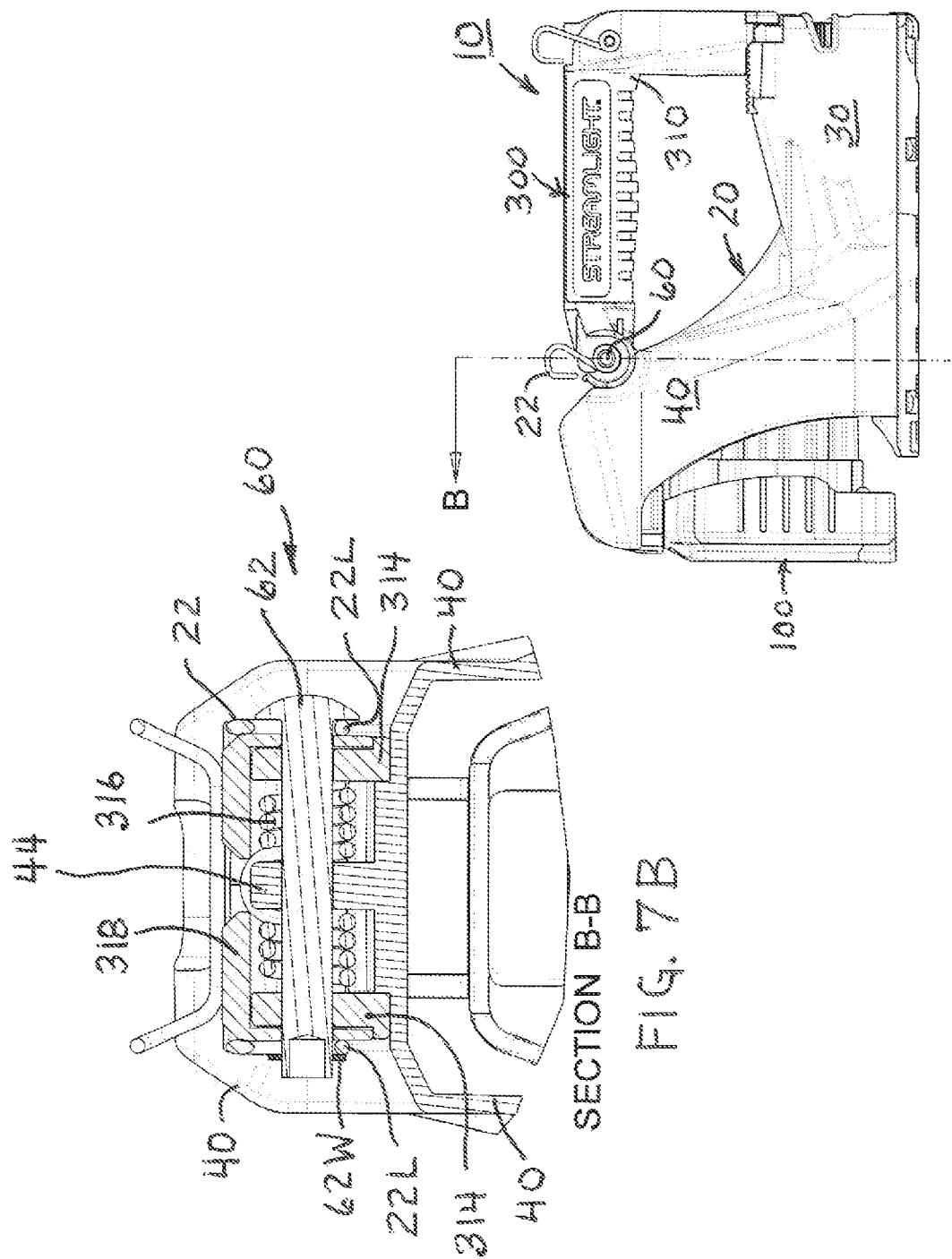

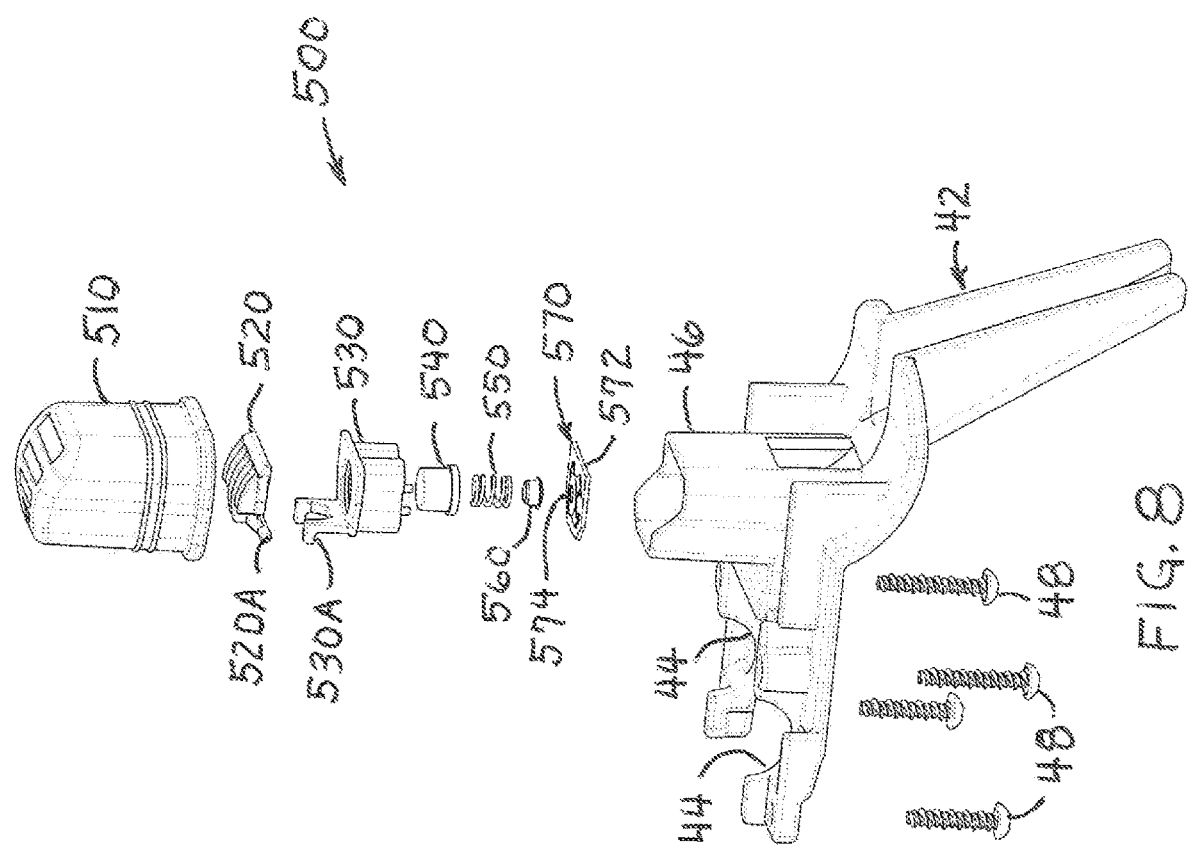

PORTABLE LIGHT HAVING A MOVABLE HEAD AND/OR A MOVABLE HANDLE

The present invention relates to a portable light and, in particular, to a portable light having a movable head and/or a movable handle.

Lantern style portable lights typically include a housing or box to contain a battery, a fixed handle on the top of the box, and a light source at one end of the box. Lantern lights are frequently used by firefighters and other first responders, builders and mechanics, repair and maintenance persons, and the like where a large and powerful light facilitates their work.

Lantern lights have been improved by, e.g., having rechargeable batteries that can be recharged when inside the light using an external charger, typically a charger having a receptacle configured to receive the lantern housing, or when removed from the lantern light. Further improvement has come from incorporating high-efficiency high-brightness light emitting diode (LED) light sources and/or high capacity batteries, e.g., lithium-ion batteries, to provide extended operating times.

Flexibility for the user of the lantern style portable light has been provided by placing the light source in a light housing that is pivotable relative to the light housing, e.g., pivotable by about 90°, thereby allowing a user more freedom to direct the light produced by the lantern in a desired direction. In addition, straps and clips may be provided so that the lantern light can be attached to or hung from various objects, e.g., a firefighter's protective clothing.

The FIRE VULCAN® light and the VULCAN® 180 light available from Streamlight, Inc., of Eagleville, Pa., are examples of presently available lantern style lights that are robust, that have substantial operating times and a bright light, and that provide flexibility of configuration for the user.

Applicant believes, however, that there may be a need for a portable light that can provide even greater flexibility for the user, and/or that such light may be a lantern style light.

Accordingly, a portable light may comprise: a light body 20 for receiving a source of electrical power; a light head including a light source for producing light; a pivot assembly movably coupling the light head to the light body, the pivot assembly including a pivotable joint for pivoting the light head towards and away from the light body and including a rotatable joint for rotating the light head relative to the light body; a handle assembly may be coupled to the light body by a handle pivot so as to be pivotable away from and toward the light body and have a releasable latch assembly that retains the handle housing adjacent the light body; and a switch assembly supported by the light body for selectively coupling the source of electrical power with the light source for energizing the light source to produce light. Thus the light head may be both pivotable and rotatable relative to the light body.

Further, a portable light may comprise: a light body for receiving a source of electrical power; a light source supported on the light body for producing light when energized; a handle assembly including a handle housing coupled to the light body by a handle pivot so as to be pivotable away from and toward the light body; a torsion member for biasing the handle housing to pivot towards the light body; a releasable latch assembly that retains the handle housing adjacent the light body when the handle housing is adjacent to the light body; and a switch assembly for selectively coupling the source of electrical power with the light source for energizing the light source to produce light.

In addition, a portable light may comprise: a light body for receiving a source of electrical power; a light head movably supported on the light body and including a light source for producing light when energized; a handle assembly including a handle housing that is coupled to the light body by a handle pivot so as to be pivotable away from and toward the light body; and a torsion member for biasing the handle housing to pivot towards the light body; a switch assembly supported by the light body for selectively coupling the source of electrical power with the light source for energizing the light source to produce light. Thus the light head may be movable relative to the light body.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 1A through 1E are views of an example embodiment of a portable light having a movable head and/or a movable handle from various viewpoints;

FIG. 4 is a front view of an example light head of the example light of FIGS. 1A-2C, FIG. 4A is a side cross-sectional view thereof.

FIGS. 5A through 5C are side views and an end view of the example portable light of FIGS. 1A-2C with an example embodiment of a pivotable handle pivoted upward from a stowed position thereof;

FIGS. 7A and 7B are a side view and a cross-sectional view of an example pivot for the pivotable handle thereof; and FIG. 8 is an exploded view of an example switch assembly suitable for use in the example portable light.

Figure 1A:
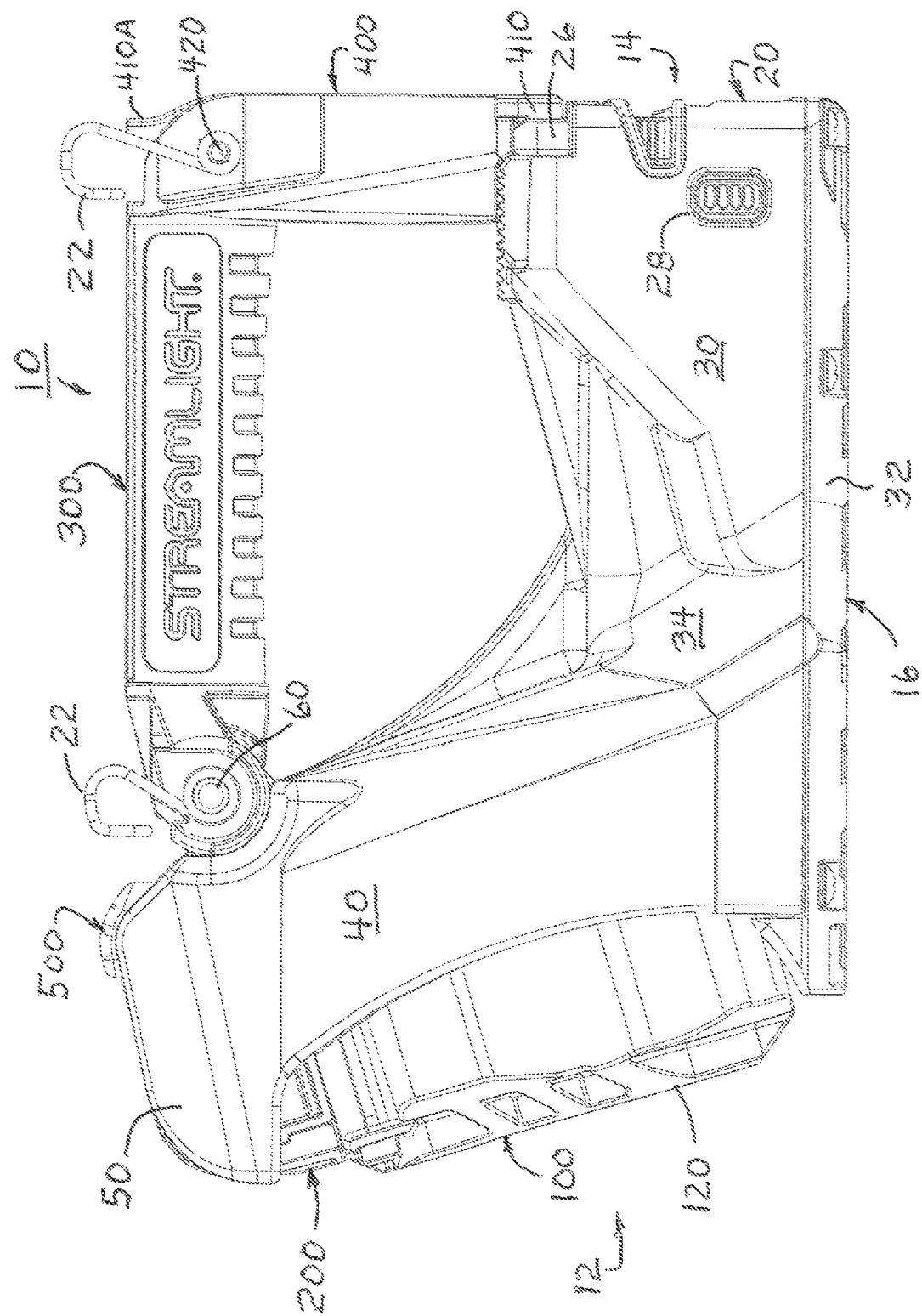

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1B:
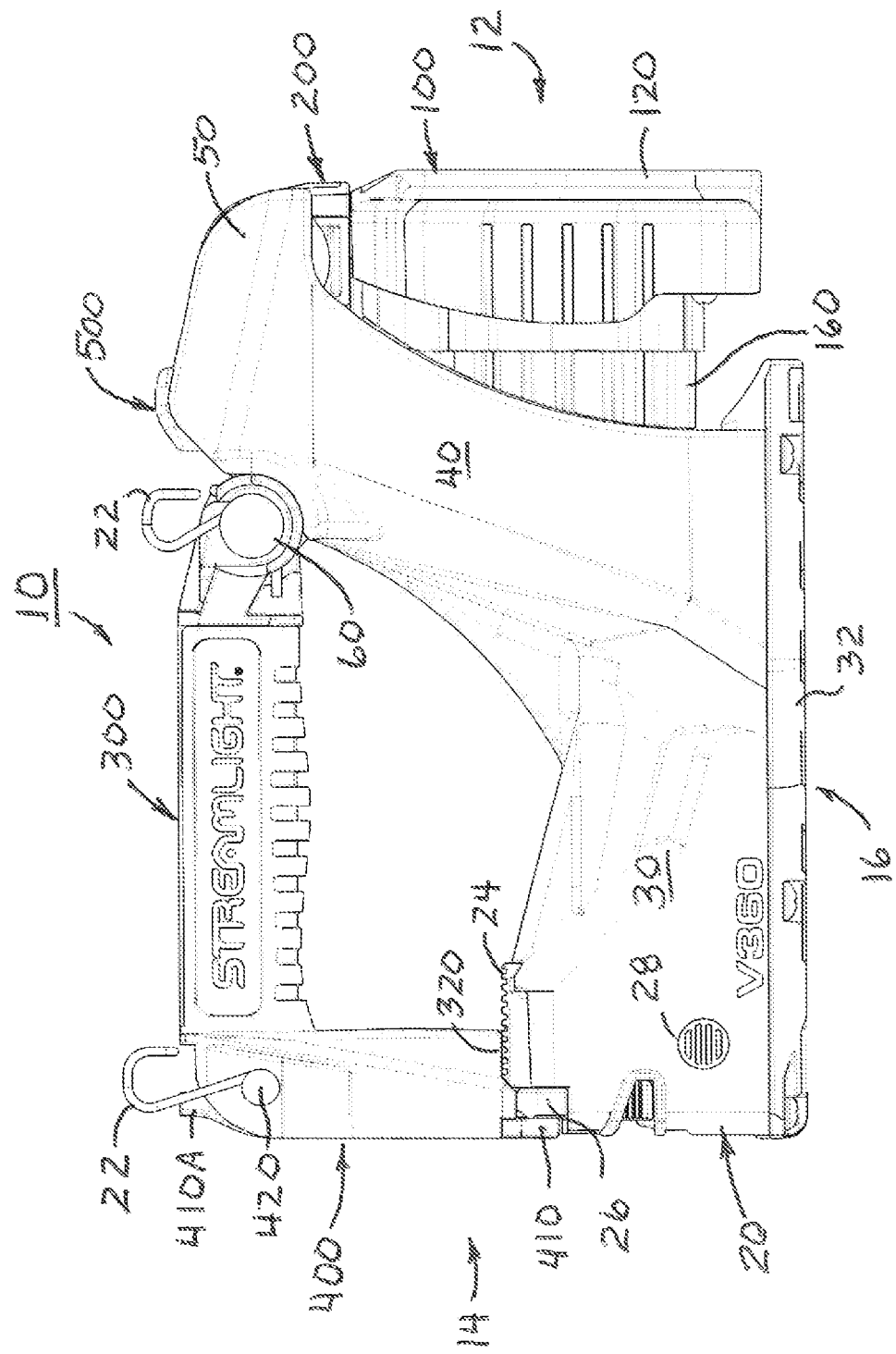
Figure 1C:
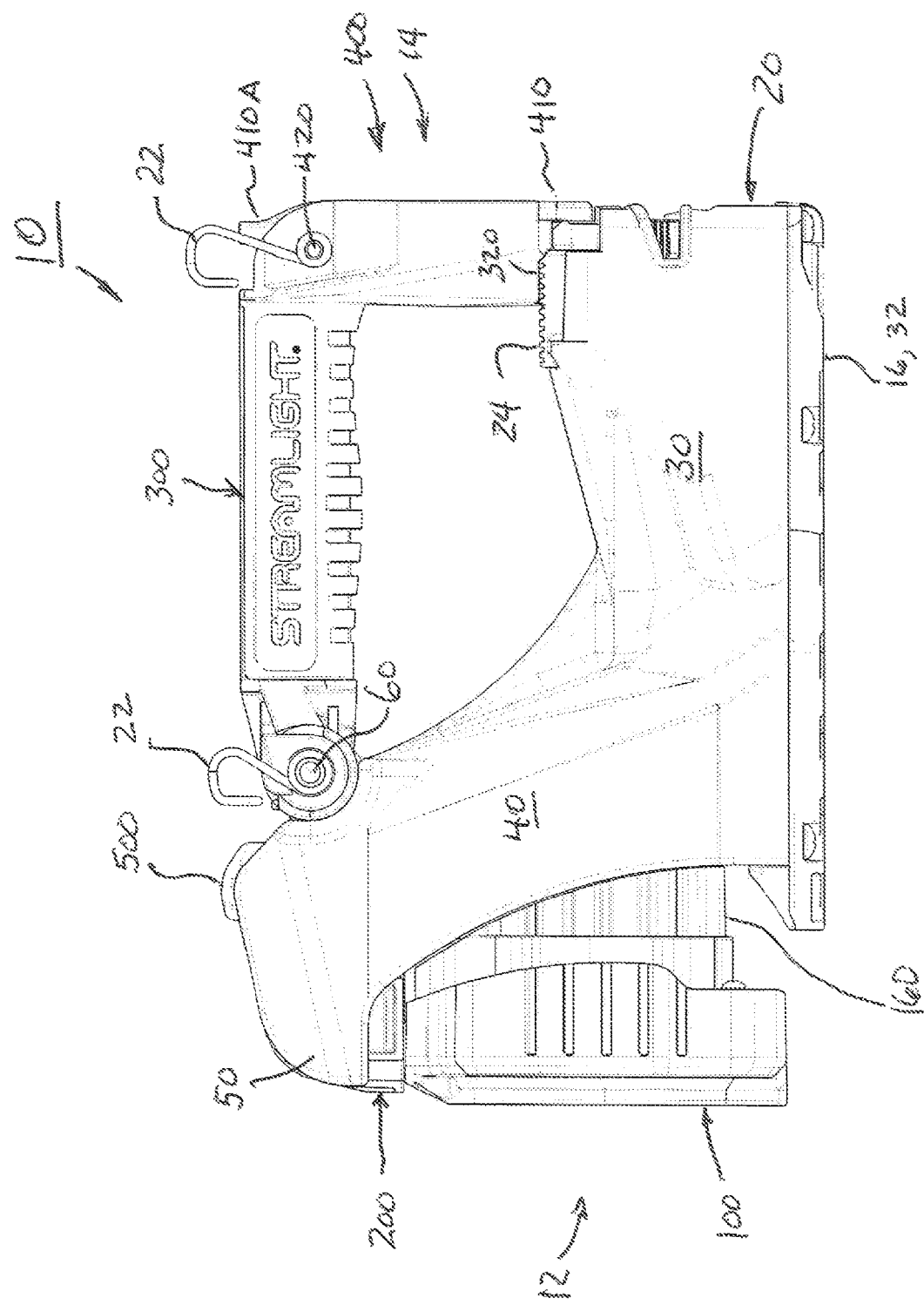
Figure 2A:
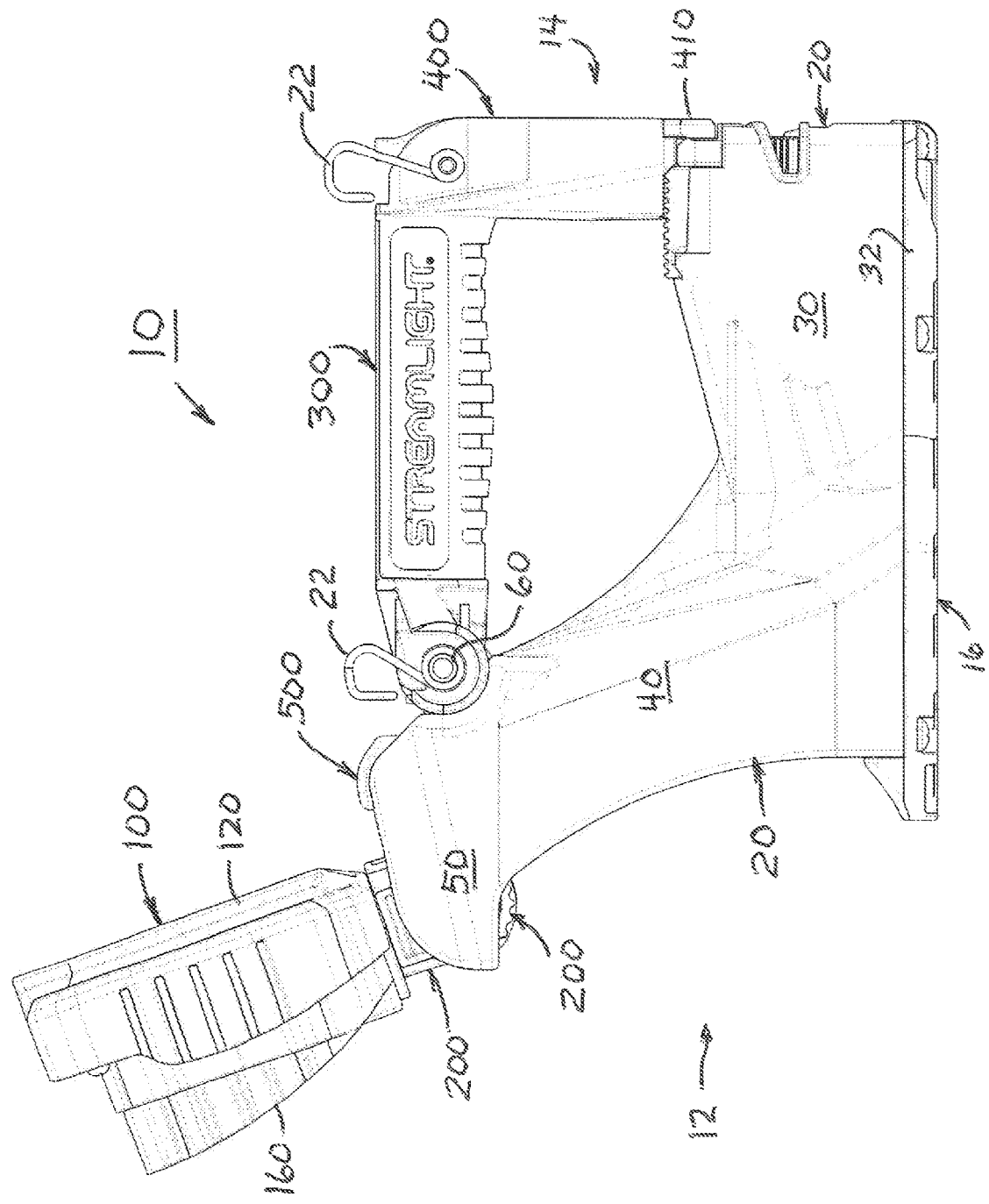
FIG. 2A is a side view of the example portable light of FIGS. 1A-1E with an example embodiment of a light head pivoted upward from a stowed position thereof.
Figure 2B:
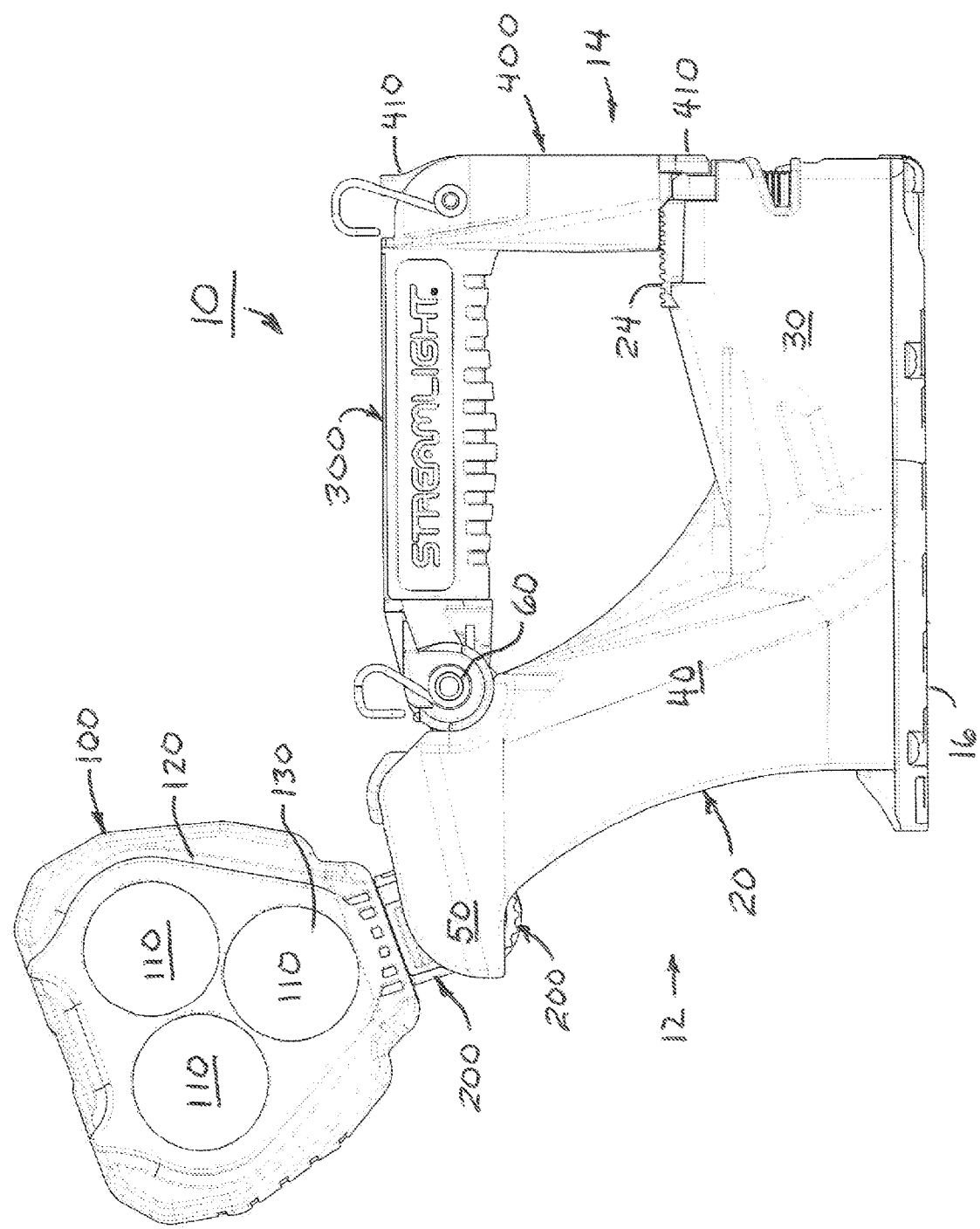
FIGS. 2B-2C are side views thereof with the example light head rotated in opposite directions from the position of FIG. 2.
Figure 2C:
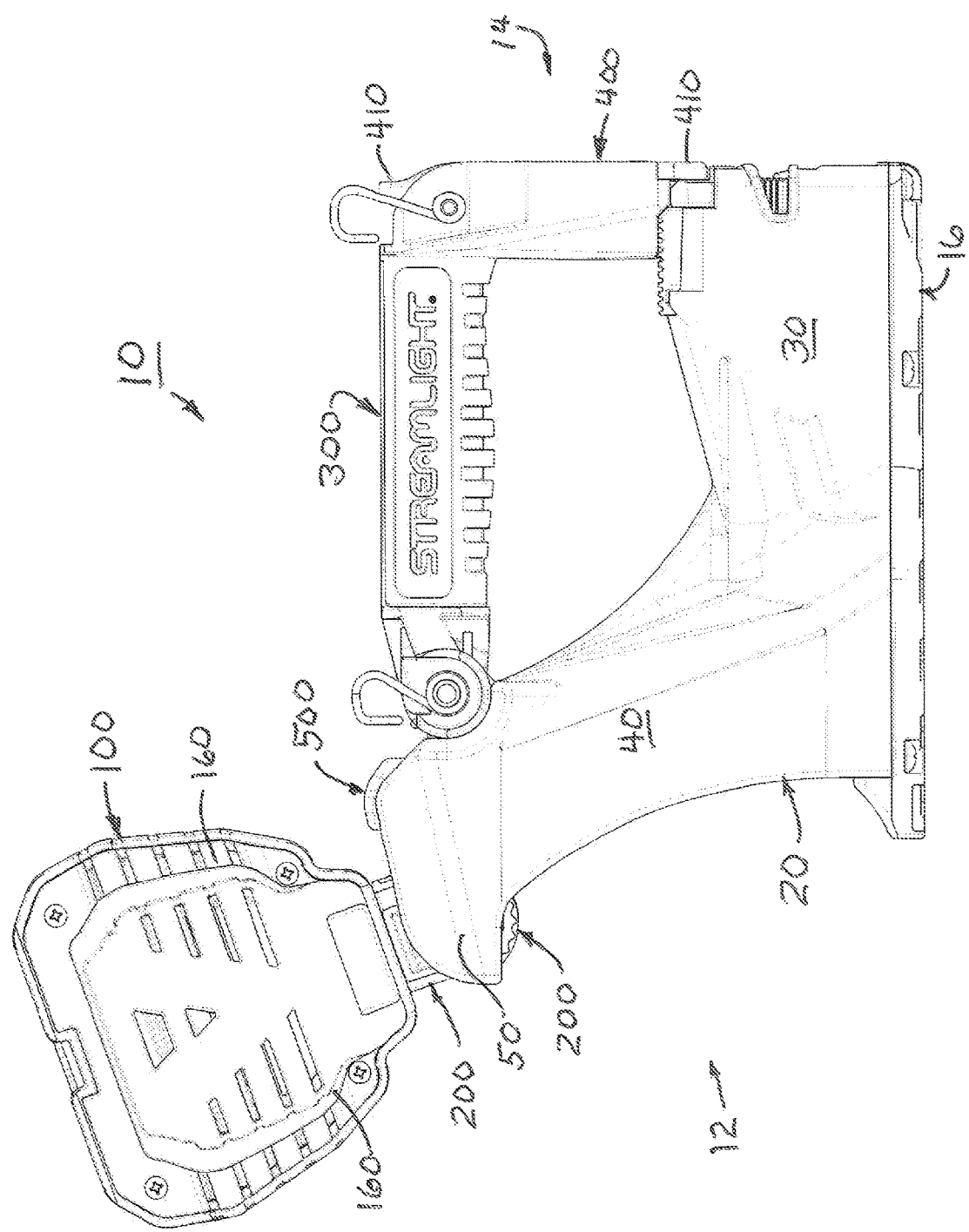

FIGS. 1A through 1E are views of an example embodiment of a portable light 10 having a movable head 100 and/or a movable handle 300 from various viewpoints; FIG. 2A is a side view of the example portable light 10 of FIGS. 1A-1E with an example embodiment of a light head 100 pivoted upward from a stowed position thereof, and FIGS. 2B-2C are side views thereof with the example light head 100 rotated in opposite directions from the position of FIG. 2A.

Portable light 10 comprises a light body 20 having a light head 100 and a handle 300. Light head 100 is preferably at the forward end 12 of light 10 and is pivotable on a pivot assembly 200 to be moved away from light body to a deployed position and moved toward light body 20 towards a stowed position. In addition, light head 100 is rotatable on pivot assembly 200 when away from light body 20 thereby to have two degrees of movement. In a preferred embodiment, light head 100 is pivotable on pivot assembly 200 by about 180° or more and is also rotatable on pivot assembly 200 by about plus or minus 90° or more. This novel and flexible movability of light head 100 may be utilized whether portable light 10 is being carried, is resting on base 16 of light body 20 or is resting on the rearward end 14 of light body 20. Both the base 16 and the rearward end of light body 20 are preferably configured so that portable light 10 may rest on a surface in different orientations.

Portable light 10 has a handle 300 by which it may be carried by a user, the handle 300 and light body 20 preferably being shaped so that the space therebetween is of sufficient size to permit a user's gloved hand to grasp handle 300. A switch assembly 500 of light 10 is provided for controlling the lights source of light head 100, e.g., to be turned ON and OFF. An exposed actuator of switch assembly 500 may be provided at any convenient location on portable light 10. In one preferred position, the actuator of switch assembly 500 is located proximate to handle 300 whereat it can conveniently be operated by a user of light 10, e.g., by the user's thumb when his other four fingers grasp handle 300. Portable light 10 is considered to define a longitudinal axis between the forward end 12 thereof and the rearward end 14 thereof. Handle 300 is, e.g., generally parallel to the longitudinal axis, as is base 16 of light 10, but neither needs to be parallel.

Additionally and/or alternatively, handle 300 may be a handle assembly 300 wherein one end of handle 300 is pivotably mounted 60 to light body 20 so that handle 300 is pivotable away from and toward light body 20. Handle housing 310 is preferably L-shaped or hook shaped and so when not adjacent to light body 20, handle housing 310 may be utilized as a hook for hanging light 10 from an object.

Preferably the pivotable mounting 60, e.g., pivot 60, is biased such that the other end of handle assembly 300 is biased to move toward light body 20 when not being pulled away from light body 20, e.g., by a user's hand. As a result, handle assembly 300 provides a clamp wherein an object can be held between the other end, i.e. unlatched end, of handle 300 and light body 20, whereby portable light may be clamped to such object.

Preferably, handle assembly 300 includes a latch 400 by which the other end of handle 300, i.e. the end that is distal from the pivoted end, is retained adjacent to light body 20. i.e. is latched to light body 20 when handle 300 moves adjacent to light body 20. Also preferably, latch 400 latches by engaging light body 20 when the rearward end of handle 300 moves against light body 20, e.g., by the latch member 410 engaging light body 20 and requires an operator action, e.g., pressing on the actuator end 410A of latch member 410, to release that end of handle 300 from light body 20.

Pivot 60 for handle 300 and pivot 420 for latch member 410 each include a respective fastener, e.g., a pin or rivet, that provide respective axles on which handle 300 and latch member 410 pivot. Pivots 60 and 420 each provides an additional function by supporting respective strap rings 22 proximate the forward and rearward ends of handle 300 to which a strap or sling or other carrying aid may be attached or by which portable light 10 may be hung on a hook or other part of an object. Light body 20 and handle assembly 300 preferably have respective gripping members 24, 320, e.g., grippers 24, 320 that are of a resilient material, that engage each other when handle assembly 300 is latched against light body 20 and that engage an object to which portable light 10 is clamped by the clamping action of spring biased handle assembly 300.

Pivot assembly 200 includes a pivot block 210 that rotates on an axle between the two opposing pivot support receptacles 50 at the upper end of pillar part 40 of light body 20 so that light body 100 may be pivoted from a position adjacent to light body 20, e.g., a stowed position, as far as a raised position. e.g., a deployed position, as illustrated in FIGS. 2A-2C, e.g., by about 180° or more from its stowed position. At any position away from light body 20, light head 100 may be rotated clockwise and counter clockwise, as illustrated in FIGS. 2B-2C, by at least about +/−90°.

Rotation of light head 100 is provided by a rotatable joint between an end of light head 100 and pivot block 210 of pivot assembly 200 where they are adjacent. In a preferred embodiment, light head 100 pivots about a pivot axis that is transverse to the forward-rearward direction of light 10 and rotates about an axis of rotation that is transverse to the pivot axis.

Electrical connections between electrical elements in light body 20, e.g., switch assembly 500 and the source of electrical power, and electrical elements in light head 100, e.g., light source(s) 110, is provided by, e.g., one or more electrical wires that pass through openings in light body 20, light head 100 and pivot assembly 200, which provide the range of movement described above, but could be provided by one or more slip rings, rotary contacts and the like which could allow for more than +/−90° of rotation, e.g., 360° of rotation of light head 100, if not continuous rotation.

Light body 20 has main housing part 30 having a battery part 34 in which a source of electrical power may be disposed, e.g., a lithium-battery, and preferably a rechargeable lithium battery. A forward part or pillar 40 of light body 20 extends upwardly from main housing 30 and may optionally extend forwardly in the direction of forward end 12 of portable light 10. Pivot assembly 200 for light head 100 is preferably disposed proximate the upper and forward end of pillar 40 in a pivot support 50 and/or pivot receptacle 50 thereof. A light body or housing base 32 of light body 20 covers the bottom of main housing 30 providing the base 16 of light 10. In one preferred embodiment, housing base 32 includes features, e.g., recesses and/or receptacles and/or edges that enable light 10 to be placed into and retained in a charging device for being recharged, e.g., for receiving electrical power from the charging device to recharging the battery therein.

In a preferable embodiment of a light head 100, front and rear housing parts 120, 160 enclose one or more light sources 110 and a heat sink 150. A lens 130 covers the one or more light sources 110 thereof. For example, lens 130 may cover one or more openings in the forward housing 120 of light head 100 through which the one or more light sources 110 emit light. Where three separate light sources 110 are employed, each may emit light through a respective circular opening in forward housing 120 as illustrated or all three light sources 110 may emit light through a generally triangular opening in front housing 120 (indicated by a dashed lines between arcs of the circular openings), each of which is covered by lens 130.

Where portable light 10 is rechargeable, the battery within light body 20 thereof is a rechargeable battery. Light body 20 in such example typically includes an interface with a charging device from which electrical power is communicated to portable light 10 for charging the rechargeable battery therein. While either an interface employing electrical contacts or a wireless interface employing electromagnetic energy transfer may be provided, one embodiment of the example light 10 has a light body 20 that has electrical contacts 18 and a mechanical configuration that retains the portable light 10 in an external charging device. An example mechanical retention mechanism may include releasable latching members that engage the base or bottom of the light and/or that engage the sides of the light. An example electrical contact arrangement may include complementary electrical contacts of the portable light 10 and a compatible charging device therefor and such electrical contacts may be disposed, e.g., on the bottom of the light and/or on the rearward end thereof.

An example of a portable light charging device that is suitable for use with an embodiment of the example portable light 10 may be found in, e.g., U.S. Pat. No. 10,240,729 entitled "PORTABLE LIGHT AND CHARGING DEVICE THEREFOR" which was granted to the present Applicant on Mar. 26, 2019, and which is hereby incorporated herein by reference in its entirety. The present portable light 10 may advantageously include a light body 20 that is configured to be compatible with an external charging device that is already in use, such as that described in the foregoing patent, thereby to allow interoperability of the new example portable light described herein with a common charging device for other portable lights, thereby to simplify upgrading to the new portable lights without having to also obtain and install new charging devices therefor.

A pressure release valve 45 may be provided to vent gas under pressure from inside light body 20, and may be covered 45, e.g., at the rearward end of light body 20. Electrical contacts 18 for charging a power source dispose within light body 20 may be movable contacts 18, e.g., or may be spring loaded contacts 18 or fixed contacts 18 or the heads of fasteners 18, for providing reliable electrical connections to compatible electrical contacts of a charging device.

Figure 3A:
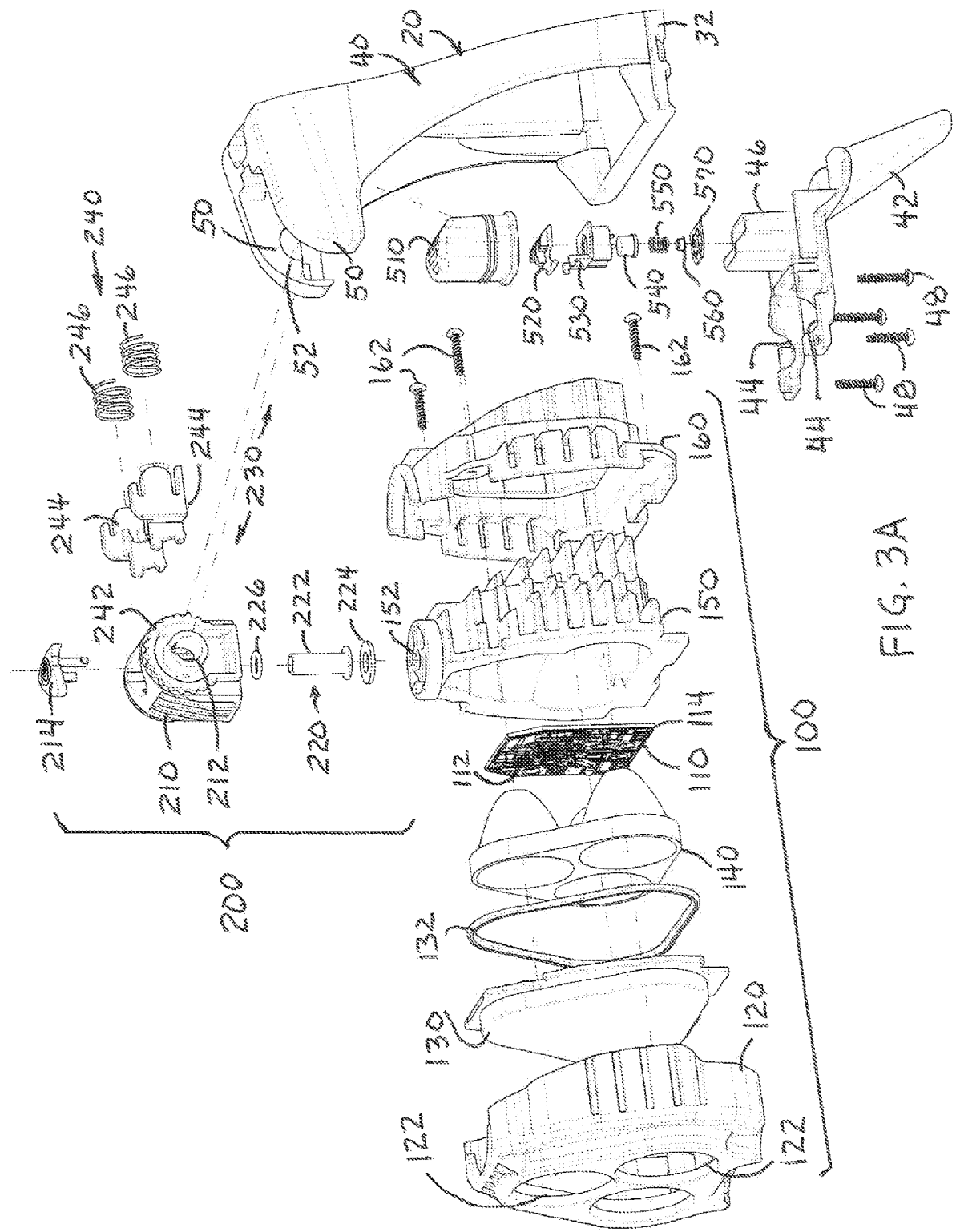
FIGS. 3A and 3B are a single figure displayed on two sheets that is an exploded view of the example portable light of FIGS. 1A-1E and 2A-2C.
Figure 3B:
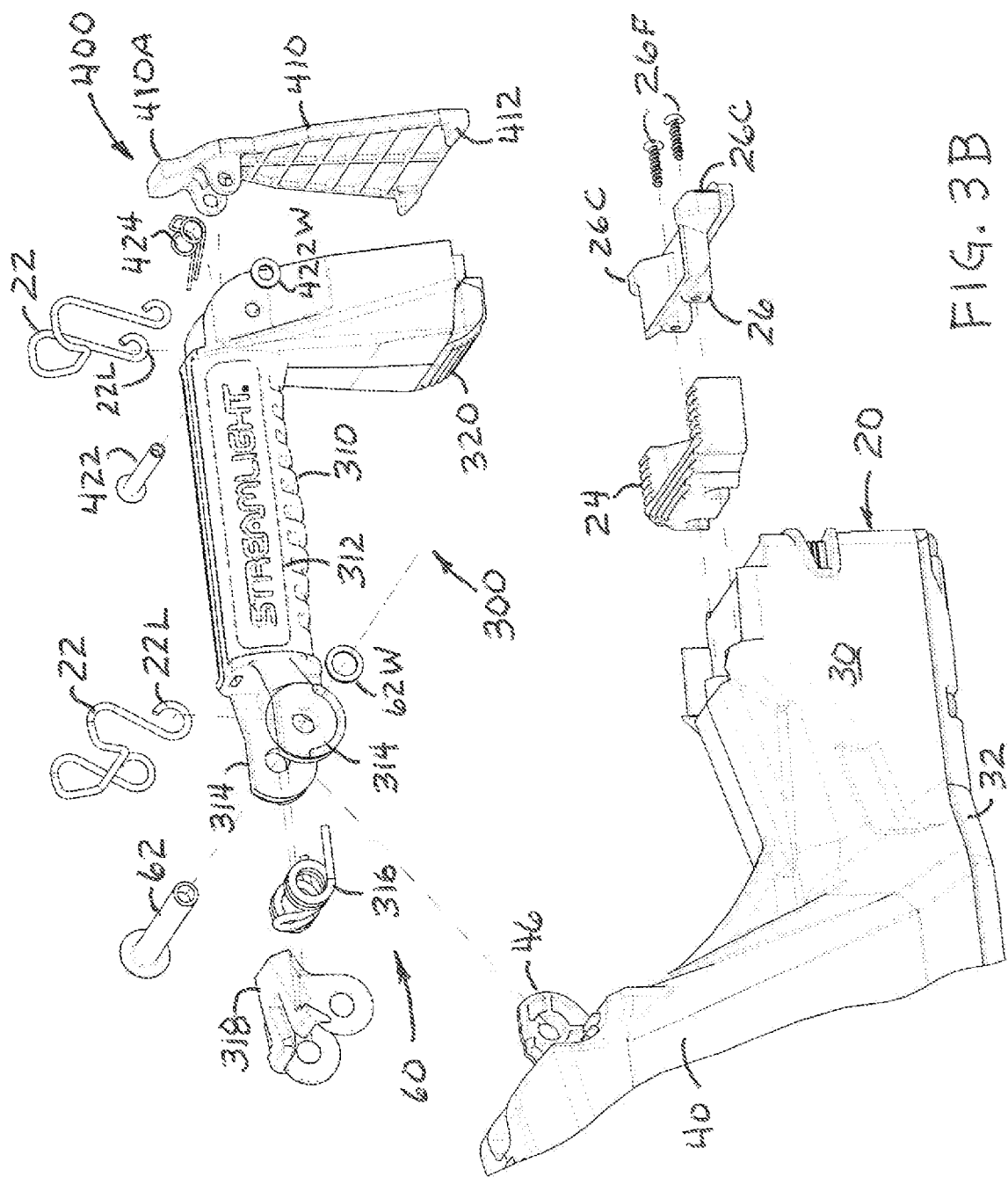

FIGS. 3A and 3B are a single figure displayed on two sheets that is an exploded view of the example portable light 10 of FIGS. 1A-1E and 2A-2C. Light head assembly 100 includes a front housing 120 and a rear housing 160 that enclose other elements thereof, e.g., light sources 112 and beam forming element 140, and that are held together to provide an enclosure 120, 160 therefor by one or more fasteners 162. A seal 132 may be provided to reduce the entry of moisture and/or debris into the space enclosed by lens 130 and heat sink 150 in which the light source 110 and beam forming element 140 are disposed.

A heat sink 150 therein serves to remove heat from light source 110 which includes one or more light producing elements 112, preferably light emitting diodes (LEDs) 112, mounted on a light source circuit board 114. Heat produced by LEDs 112 is conducted via circuit board 114, which may include thermally conductive portions, e.g., a substrate of a high thermal conductivity material and/or thermally conductive paths, e.g., metal or solder filled through vias therethrough. Circuit board 114 is disposed against a seat of heat sink 150 which is preferably of a highly thermally conductive material, e.g., aluminum or another metal, and which has heat dissipating features, e.g., fins, tines, slots, and the like that increase the surface area thereof for increasing transfer of heat to the air surrounding heat sink 150. Heat sink 150 also preferably provides an interface 152 for the rotatable joint between light head 100 and pivot block 210 of pivot assembly 200. Heat removal from heat sink 150 is furthered by rear housing 160 having plural openings, e.g., slots, holes, and the like, that facilitate air flow into, out of and through light head 110 and across heat sink 150 to remove heat therefrom, e.g., by convection.

A beam forming element 140 such as a reflector 140 is disposed adjacent to light source 110 in position to form the light emitted by the one or more light sources 110, 112 into a beam of light having desired optical characteristics. Beam forming element 140 may be a reflector having curved reflective surfaces shaped to reflect light from the one or more LEDs 112 into one or more light beams having a desired beamwidth and divergence, e.g., a spot beam or a flood beam, directed, e.g., generally forwardly through lens 130 and through one or more openings in forward housing 120. Beam forming element 140 may be an optically clear internally reflective solid optical element 140 that forms one or more beams of light from the one or more light sources 110, 112 by total internal reflection (TIR).

An optically clear lens 130 is provided in front of beam forming element 140 so that the beam of light formed thereby passes through lens 130 to be emitted forwardly from light head 100. Front housing may have one or more openings 122 corresponding to the one or more output openings or surfaces of beam forming element 140, whereby light from one or more LEDs 112 is formed into one or more beams of light exiting through lens 130 and the openings 122 of front housing 120. In the illustrated example, three LEDs 112 produce light that is shaped by the three optical elements of beam forming element 140 that exits as three beams of light through lens 130 and openings 122, and may together combine to provide a combined light beam emitted by light head 100. From housing 120 may have individual openings, one for each light source 110, 112 of may have a single opening through which light from all light sources 110, 112 pass.

Light head 100 is attached to pivot assembly 200 by a rotational joint 220 between an interface feature 152 of heat sink 150 and pivot block 210 of assembly 200. Compatible surfaces at the top of heat sink 150 and at the bottom of pivot block 210 are disposed adjacent to each other and are retained there by a fastener 222, e.g., a rivet 222, that passes through respective holes in heat sink 150 and pivot block 210. Typically, the head of fastener 222 is disposed inside heat sink 150 and the distal end thereof is disposed inside of pivot block 210 whereat a washer 224 and seal 226, e.g., O-ring 226, are placed on the distal end of fastener 220 which is swaged, rolled or peened over to retain the foregoing elements of rotational joint 220 therebetween. Thus light head 100 is rotatable about a central axis of fastener 222 relative to pivot assembly 200.

Pivot assembly 200 is attached to light body 20 by a pivot joint 230 between pivot block 210 and one or more pivot block receptacles 50 at the forward end 12 of light body 20, e.g., preferably near the top forward end of the forward pillar 40 of light body 20. Pivot block 210 has one or more axles 212 extending therefrom that are rotatably disposed in respective receptacles 50 whereby pivot block 210 is rotatable relative to light body 20. Each axle 212 is preferably a cylindrical projection extending outwardly from pivot block 210 into circular receptacles 50. Each receptacle 50 may be provided by a semicircular recess 52 of light housing 30 cooperating with a complementary semicircular recess 44 of a forward housing insert 42 of housing 40 when the forward housing 40 is secured into forward pillar 40 of housing 30 and retained therein by one or more fasteners 48, e.g., screws 48, thereby providing a rotatable joint 230 that is a pivot 230 on which pivot assembly 200 and light head 100 are pivotable relative to light body 20.

The result thereof is that light head 100 is both pivotable away from and toward light body 20 on pivot assembly 200 and is also rotatable relative to pivot assembly 200, whereby the combination of pivotable and rotational movement provided to light head 100 relative to light body 20 provides great flexibility to a user of portable light 10 to direct light therefrom in a desired direction whether portable light 10 is being held by its handle 30 or is placed with the base 16 thereof upon a surface or with the rearward end 14 thereof upon a surface.

Optionally, but often preferably, pivot assembly 200 has a detent arrangement 240 so that the pivot assembly 200 and light head 100 supported thereby will tend to remain in a position into which it is placed relative to light body 20 by a user. The detent arrangement 240 is provided by a plurality of detent features 242 arranged on pivot block 210 that cooperate with detent members 244 that engage detent features 242 under bias from springs 246. The detent features 242, e.g., alternating projections and recesses, cause detent members to move closer to and farther away from pivot block 210 as pivot block 210 is rotated on axles 212 in receptacles 50.

Switch assembly 500 for controlling operation of light source 110 of portable light 10 is disposed in light body 20, e.g., adjacent handle 300 in the forward part 40 of housing 30. Switch assembly 500 comprises an externally accessible actuator 510, e.g., a flexible boot 510, through which force may be applied to plunger 520 which is pivotable in inner housing 520. Movement of plunger 520 causes actuator member 540 to move in the same direction thereby applying force to switch element 570, e.g., a snap dome switch element 574, via coil spring 550 and button 560. Switch assembly 500 is retained in place in light body 20 by forward housing insert 42 with elements thereof disposed in hollow support 46 thereof. Switch element 570 is, e.g., generally parallel to the longitudinal axis of light 10, but need not be, and is generally transverse to an axis defined by plunger 520, actuator member 540, coil spring 550 and button 560.

Housing 30 of light body 20 has a recess at the upper rear end thereof into which are disposed a gripper 24 and a latch interface 26, or latch clasp 26, both of which are retained therein by one or more fasteners 26F. Latch interface 26 has one or more latch clasps 26C relating to latch assembly 400.

Handle assembly 300 is pivotable mounted on light body 20 and biased by torsion spring 316 to move towards light body 20, e.g., whereby gripper 320 thereof is moved toward being against gripper 24 of light body 20. Gripper 320 will be moved into contact with gripper 24 unless an object to which light 10 is attached is between handle assembly 300 and light body 20.

Handle 310 of assembly 300 has a hand grip 312 and has a gripper 320 at the far rear end thereof, both of which may be, e.g., resilient materials that are over-molded onto handle housing 310. Latch assembly 400 of handle assembly 300 is disposed at the rear support of handle housing 310 being pivotably mounted thereto by latch pivot 420 which includes pin 422, washer 422W and latch torsion spring 424. Latch arm 410 thereof has an actuator part 410A at one end thereof and one or more clasps 412, e.g., projections 412, at the opposite end thereof that engage one or more latch clasps 26C, e.g., receptacles 26C, thereby to latch to retain handle assembly 300 in a position adjacent to light body 20, e.g., with grippers 24, 320 being adjacent.

Handle pivot 60 comprises a pin 62 that passes through one or more handle pivots 314, torsion spring 316, spring cap 318, one or more pivot members 44 of light housing 30, 40 and washer 62W. One or more strap rings 22 may be provided for facilitating the attaching of a strap, belt, lanyard or the like to light 10, and the one or more strap rings 22 may be supported by the pins 62 and/or 422 of handle pivot 60 and latch pivot 420 respectively. Strap rings 22 have a loop at each end through which the pivot pin, 62, 422 is disposed so that strap rings 22 are rotatable on those respective pivot pins. The example strap rings 22 are formed to be serpentine in shape so that a strap or other accessory may be threaded therethrough or may be wrapped around ring 22.

Handle pivot 60 is near one end of handle housing 310, e.g., is in a location near to the forward end of handle housing 310 about which handle housing 310 is pivotable relative to light body 20 over a desired angular range, e.g., to pivot away from light body 20 sufficiently for handle assembly 300 to grasp an object for supporting light 10 thereon and to pivot toward light body 20 sufficiently for latch assembly 400 to engage.

Releasable latch assembly 400 is near another end of the handle housing 310, e.g., latch 400 includes a latch arm 410 that is pivotably supported on handle housing 310 by a latch pivot 420 which is at a location on handle assembly 300 such that latch arm 410 is movable, e.g., actuatable, for latch clasp 412 thereof to at least disengage from a complementary latch clasp 26C of light body 20, or to engage with and disengage from latch clasp 26C.

Optionally, an indicator 28 of information relating to the source of electrical power 200 may be provided at a convenient location on light 10. Alternative examples thereof for indicator 28 are illustrated in FIGS. 1A and 1B. The information represented may relate to the state of charge thereof and/or the recharging status thereof, and may be indicated by lights, e.g., red and/or green LED indicator lights. For example, continuous green could indicate full or near to full charge, flashing red significantly discharged and red fully discharged and/or charging needed. Alternatively and/or additionally, e.g., flashing green could indicate being charged and continuous green could indicate fully charged.

Figure 4B:
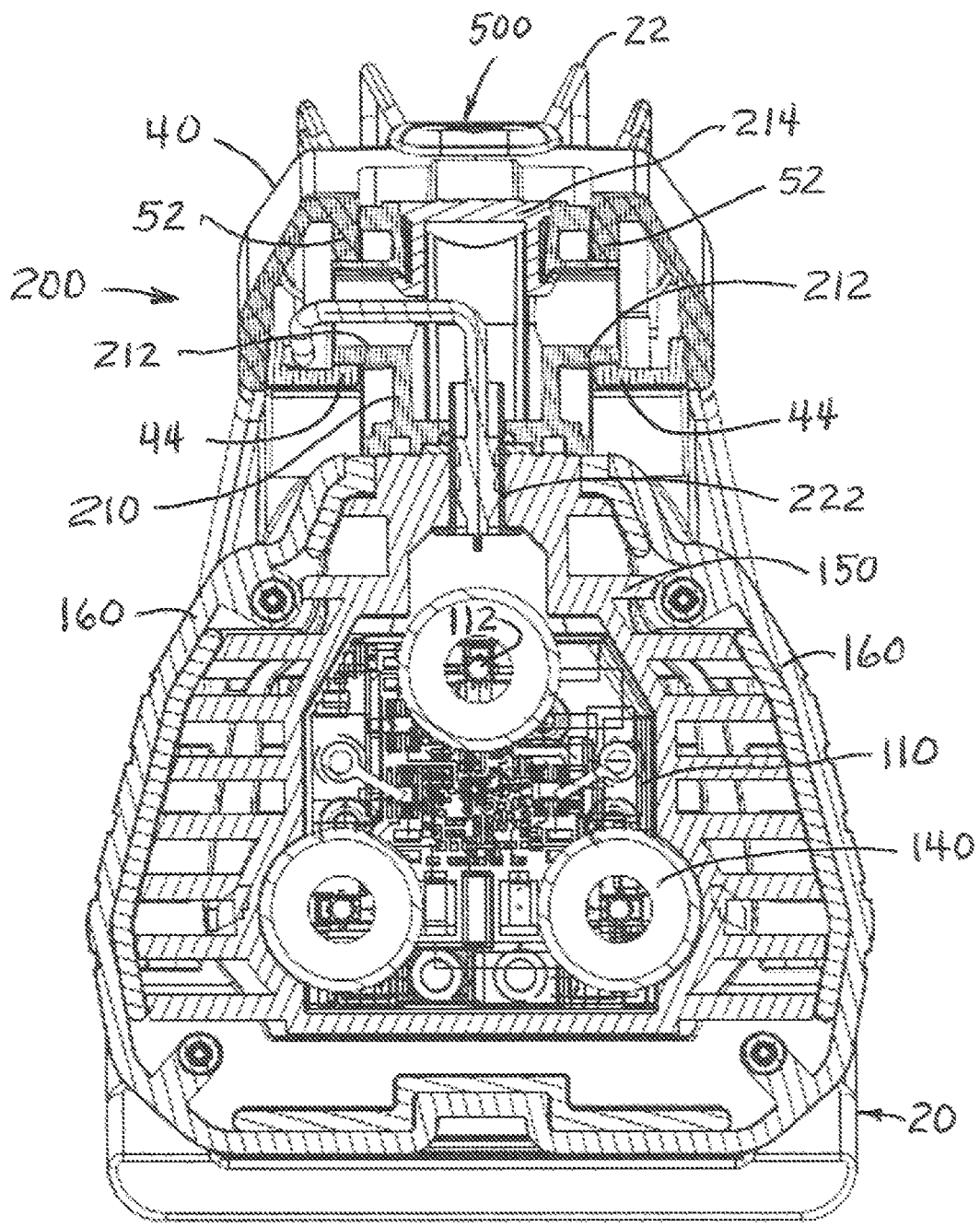
FIG. 4B is a cross-sectional view of the light head and pivot assembly thereof.
Figure 4C:
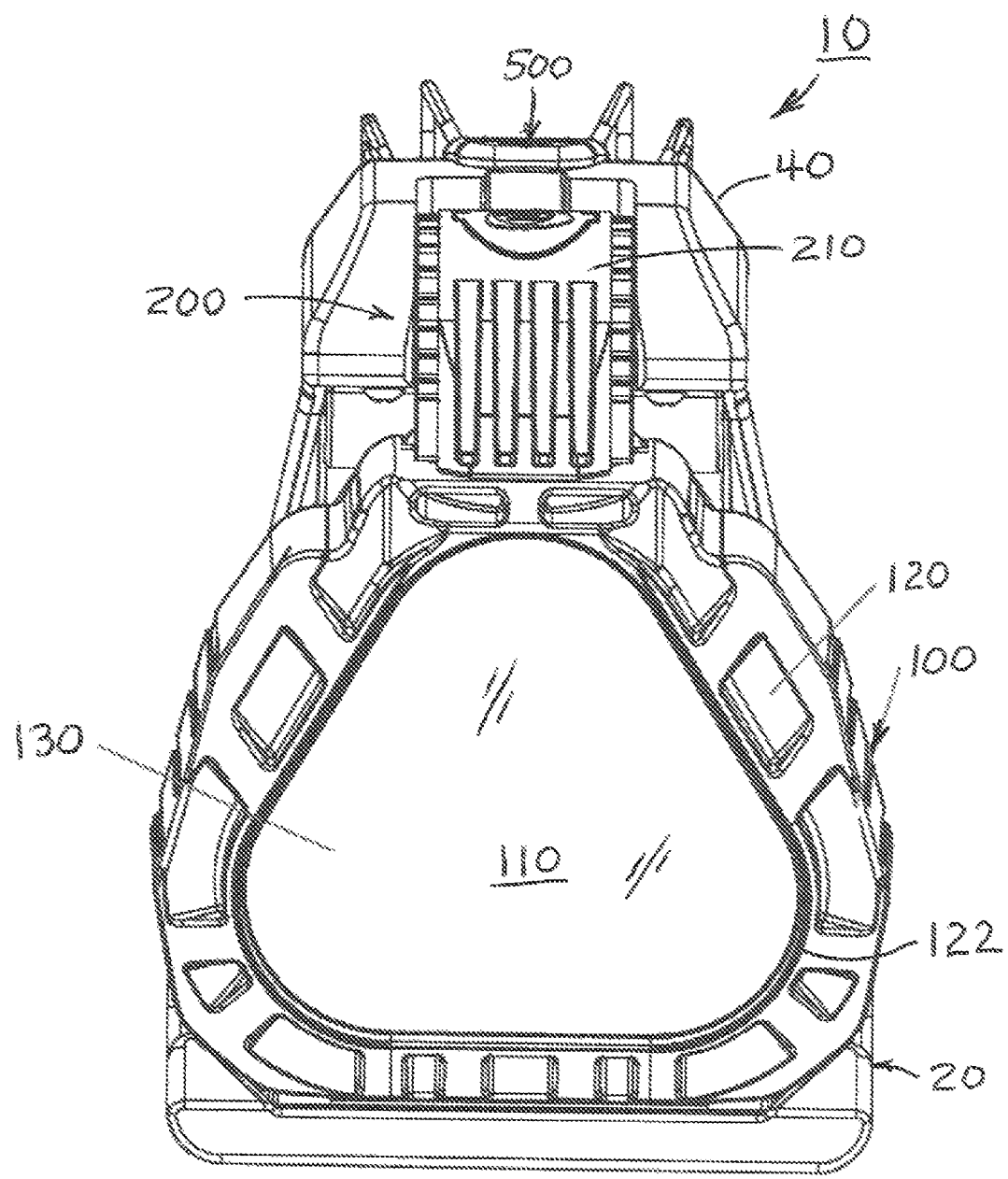
FIG. 4C is a front view thereof including a light head having an alternative lens shape.

FIG. 4 is a front view of an example light head 100 of the example light 10 of FIGS. 1A-2C with pivot block 210 thereon, FIG. 4A is a side cross-sectional view thereof, FIG. 4B is a cross-sectional view of the light head 100 and pivot assembly 200 thereof, and FIG. 4C is a front view thereof including a light head 100 having an alternative lens shape. Light source 110, e.g., circuit board 110, is disposed adjacent to heat sink 150 which preferably has a seat in the forward side thereof that is of similar size and shape to light source 110, e.g., for receiving circuit board 110 therein. Light source 110 includes one or more light emitting sources 112, e.g., light emitting diodes (LEDs) 112, that emit light in a forward direction when energized.

Optical beam forming element 140, e.g., a reflector 140 or a TIR optical element 140, is positioned in front of light source 110 to form the light produced by light emitting sources 112 thereof into a beam having the desired characteristics, e.g., what may be described as either a relatively narrower or "spot" beam or a relatively wider or "flood" beam. In the present example, three LEDs 112 produce light that is formed by three reflective surfaces of optical beam forming element 140 or by a three-input TIR optical element 140. The light from the three light sources 110 may be formed by beam forming element 140 to be a composite light beam in which the three beams from the three light sources 112 are substantially parallel to each other, or diverge from each other or converge with each other.

A lens 130, preferably a single lens 130, covers beam forming element 140 and has an outer peripheral shape and size that is substantially the same as that of heat sink 150, thereby to facilitate the sealing of the elements therebetween to reduce entry of dirt, debris and/or moisture when light head 100 is fully assembled; a seal 132 may be provided therebetween for improved sealing. Lens 130 may be optically clear, may have a textured surface for diffusing light, and/or may have convex and/or concave surfaces for modifying the direction of the light passing therethrough.

Front housing part 120 has one or more openings 122 for passing light from the one or more light sources 110 of light head 100 therethrough. An opening 122 may be provided for each light source 110 and preferably has a shape corresponding to the desired shape of the light beam passing therethrough from optical element 140 and lens 130. However, an opening 122 may be shaped to pass light from more than one of light sources 110, e.g., as illustrated by the generally triangular shape indicated by the three dashed lines and the arcs of the circles illustrating circular openings 122 in FIG. 4 that define the periphery of such triangular opening 122. An example light head 100 having a front housing part 120 with a generally triangular opening for lens 130 is illustrated in FIG. 4C.

In the example front housing part 120 illustrated in FIG. 4 three circular openings approximately corresponding to the three reflector openings are provided. In the example front housing part 120 illustrated in FIG. 4C one substantially triangular opening is provided and is of a size to approximately correspond to the outer contours of the three reflector openings. In both illustrated alternatives, the same lens 130 having a raised substantially flat triangular central part may be utilizes; in addition, the same optical element 140, light source 110, heat sink 150 and rear housing 160 may also be employed therewith.

Example pivot block 210 has opposing coaxial axles 212, e.g., cylindrical axles 212, extending from opposite sides of pivot block 210, that are disposed in respective receptacles 50 of housing part 40 of light body 20 to provide light head pivot joint 230. Each receptacle 50 includes a semicircular part 52 that is, e.g., molded with housing 30, and forward housing insert 42 has corresponding semicircular receptacles that when forward housing insert 42 is assembled into housing 30, 40 complete respect circular receptacles 50 in which coaxial axles 212 are pivotably disposed. It is noted that pivot joint 230 could be otherwise provided, e.g., by receptacles in pivot block 210 and axles in light housing 30, 40, or by a fastener that passes through light housing 30, 40 and pivot block 210.

Electrical connections between light housing 30, 40 and light head 100 may be provided in various alternative ways. For example, by respective slip rings of rotational joint 220 and of pivot joint 230, or by electrical wires that pass through respective openings in housing 30, 40, in at least one axle 212, in pivot block 210 and in fastener 222, which openings are present in the example illustrated.

The assembly of heat sink 150 with pivot block 210 to provide rotational joint 220 typically is preferably made before the assembly of elements 110-160 into a light head 100, and before the assembly of light head 100 and light body 20. An example assembly method may be as follows, although the order of assembly is only one example of an assembly order. Fastener 222, e.g., pin 222, typically is inserted into a hole at the top of heat sink 150 with its head adjacent the interior surface of heat sink 150. Then washer 224 and O-ring seal 226 are placed onto fastener 222 followed by the exposed end of fastener 222 being inserted into a hole in the bottom of pivot block 210. A tool inserted into pivot block 210 before cover 214 is attached is used to swage, roll, or otherwise form the end of fastener 222 so that pivot block 210 remains closely adjacent to end 152 of heat sink 150 and is pivotable thereon. Cover 214 is then placed in pivot block 210.

The light source 110 is placed onto heat sink 150 and, if electrical wires are employed to conduct electrical power between light housing 30, 40 and light head 100, such wires are connected to light source 110 and are placed through fastener 222 and a hollow axle 212 of pivot block 210. Beam forming element 140, seal 132 and lens 130 are placed into position adjacent to heat sink 150. Rear housing 160 is placed adjacent the rear side of heat sink 150, element 130 and lens 130, and front housing 120 is placed over lens 130, whereupon one or more fasteners 162 are inserted to secure front and rear housings 120, 160 with the remainded of the elements of light head 100 therebetween.

Then the light head 100 and pivot assembly are assembled with housing 30, 40 by placing axles 212 into receptacle parts 52 of housing 30, 40, and, if electrical wires are employed, placing the electrical wires in their desired places in housing 30, 40. Switch assembly 500 is assembled in hollow support 46 of forward housing insert 42 and insert 42 is placed into housing 30, 40 with the receptacle parts 44 thereof adjacent housing receptacle parts 42 in which are disposed axles 212 of pivot block 210. Installing fasteners 48 retains forward housing insert 42 in housing 30, 40 with pivot block 210 pivotably mounted therein to provide pivot joint 230.

Figure 5A:
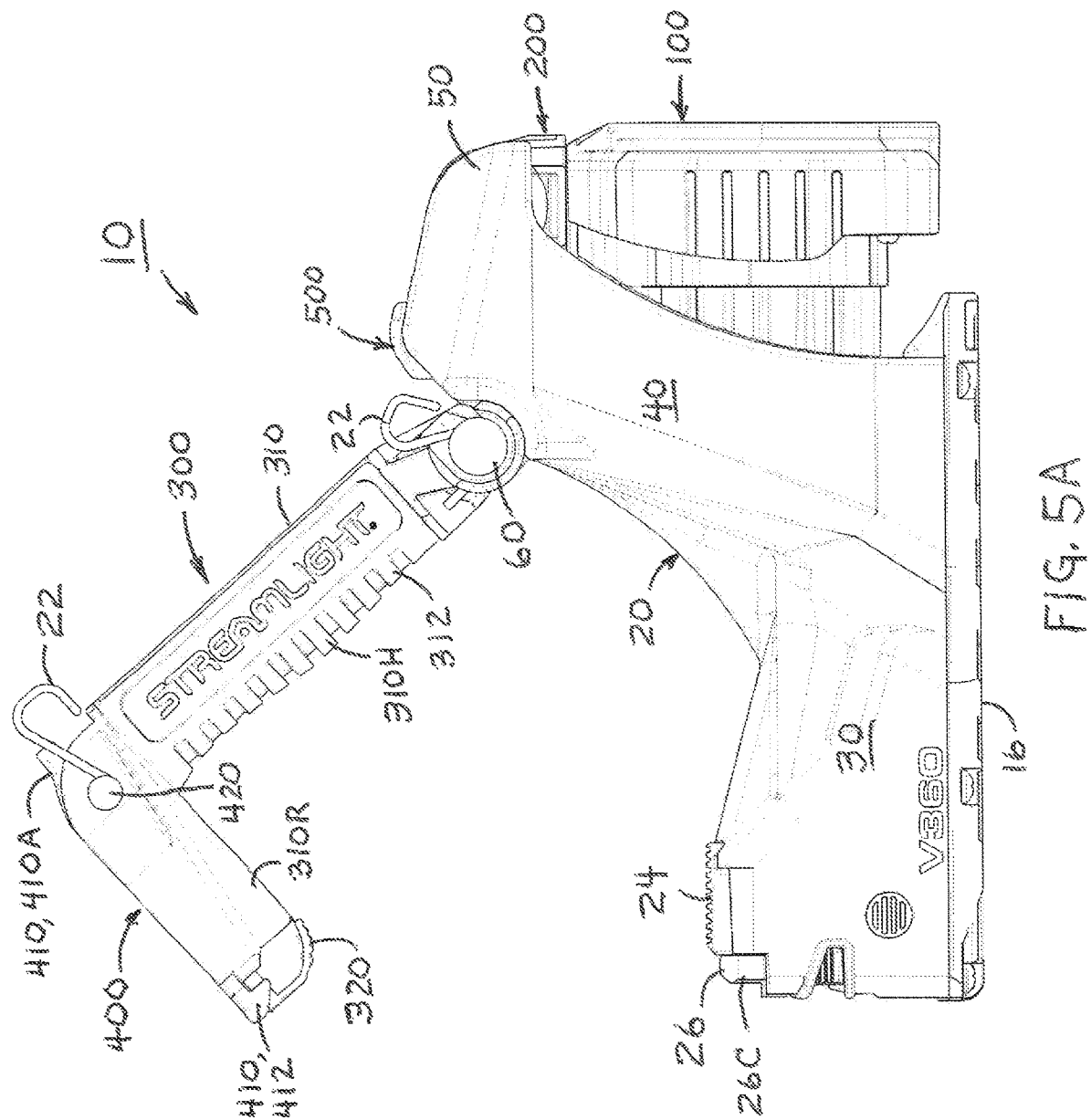
Figure 5B:
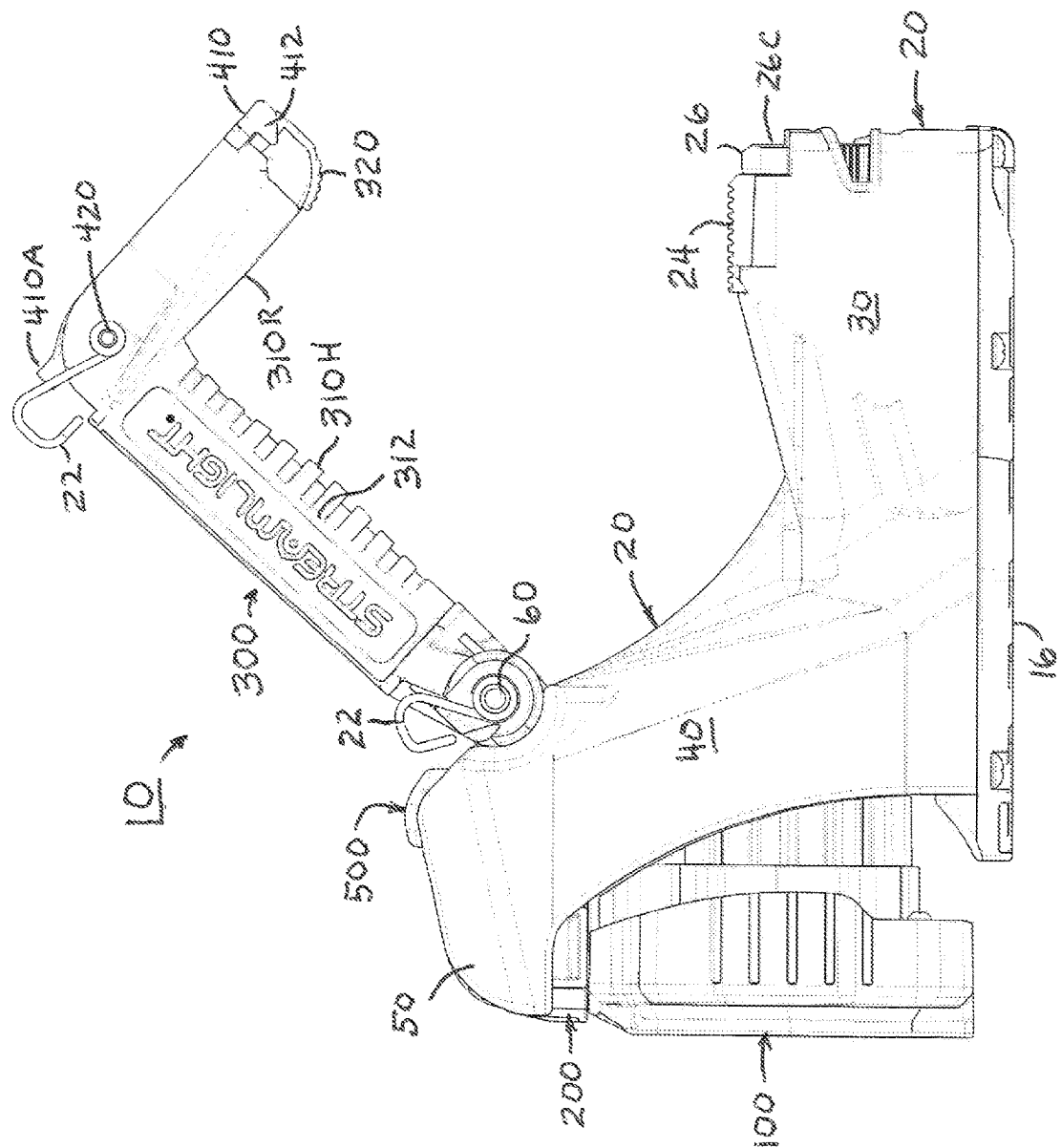
Figure 6A:
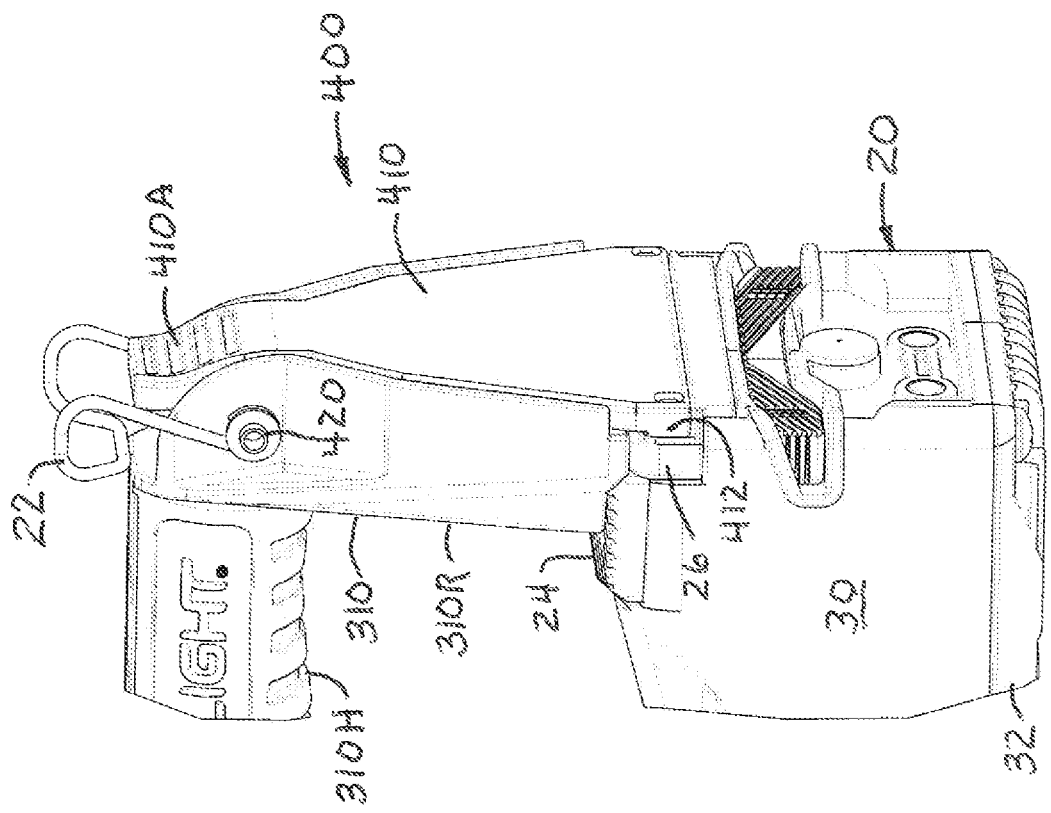
FIGS. 6A through 6B are perspective views of part of the example light showing positions of an example latch assembly for the example pivotable handle thereof.
Figure 6B:
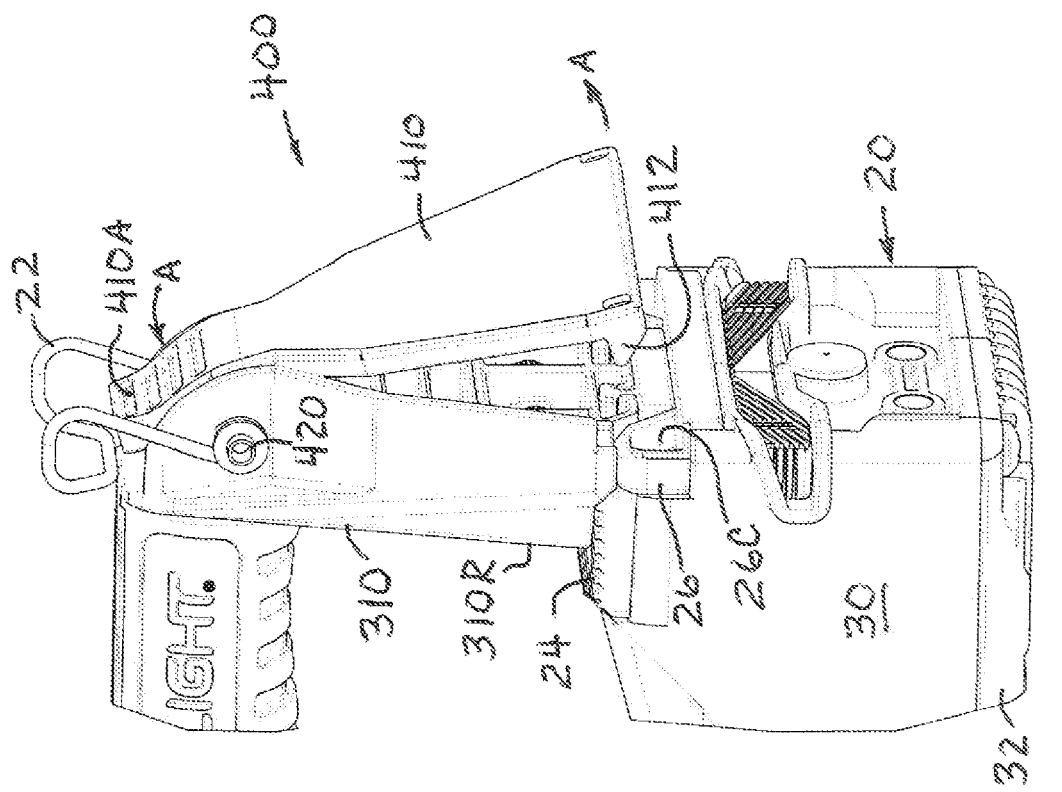

FIGS. 5A through 5C are side views and an end view of the example portable light 10 of FIGS. 1A-2C with an example embodiment of a pivotable handle 300 pivoted upward from a stowed position thereof; FIGS. 6A through 6B are perspective views of part of the example light 10 showing positions of an example latch assembly 400 for the example pivotable handle 300 thereof; and FIGS. 7A and 7B are a side view and a cross-sectional view of an example pivot 60 for the pivotable handle 300 thereof.

Example handle assembly 300 is pivotable away from light body 20 when latch assembly 400 is released and is pivotable towards light body 20 whereat a preferred example of latch assembly 400 engages handle assembly 300 adjacent to light body 30 until the latch assembly 400 is again released and handle assembly 300 is pulled away from light body 20. Preferably, handle assembly 300 is biased to move towards light body 20 absent a force urging it away from light body 20, e.g., applied by a user of portable light 10, or an object present between handle assembly 300 and light body 20 that prevents such movement.

Example handle assembly 300 includes a generally L-shaped handle housing 310 that has a substantially straight part serving as a handle 310H which may have a grip 312, e.g., a shaped part textured for improved grip and/or a resilient grip 312 that may be over-molded onto handle housing 310. A rearward part 310R of handle housing 310 extends away from the handle grip 312, e.g., transversely thereto, towards the rearward end of light body 20 and supports latch assembly 400. Handle pivot 60 at the forward end of handle housing 310 enables handle assembly 300 to pivot relative to light body 20 and light housing 30 thereof. Handle housing 310 preferably has a gripper 320 near the distal end of handle housing part 310R that may be, e.g., a textured region or a resilient gripper 320 that may be over-molded thereto. One or more respective strap clips 22 may be provided on handle assembly 300, e.g., near to or at the forward and rearward ends of handle part 310H, each movably retained by a respective fastener 60, 420.

Latch assembly 400 includes a latch arm 410 that is pivotably mounted on pivot fastener 420, 422 and that has a latch actuator 410A at the upper end thereof and one or more latch clasps 412 at the opposite, lower, end thereof. Torsion spring 424 on fastener 422 biases latch arm 410 to move to be adjacent to handle housing 310. Pressing latch actuator 410A towards handle 300 (FIG. 6B) causes latch arm 410 to pivot outward (as indicated by the arrows A) so that one or more latch clasps 412 thereof disengage from latch receptacles 26C of latch interface 26 of light housing 30 thereby to release (free) handle assembly 300 to be pivoted on pivot 60 and be moved away from light housing 30.

Releasing latch actuator 410A allows torsion spring 424 to move latch arm 410 towards rear handle part 310R and be adjacent thereto where it is ready to re-engage with latch interface 26 when handle assembly 300 returns to a position where grippers 24 and 320 are adjacent or abutting. Preferably, each latch clasp 412 has an angled lower end so that latch arm 410 is moved away from latch interface 26 when handle 300 is being returned to be adjacent to light housing 30 until latch clasp 412 becomes aligned with latch interface receptacle 26C whereupon clasps 412 move toward latch interface 26 to engage receptacles 26C thereof, thereby retaining handle assembly 300 in position against light body 20. In the illustrated example, latch arm 410 has one or more clasps 412 that are projections and light housing 30 has one or more complementary clasp receptacles 26C that are recesses, however, any complementary features that can engage to retain handle assembly 300 adjacent to light housing 310 may be employed.

Example handle pivot 60, shown in section B-B (FIG. 7B), includes a transverse fastener 62, e.g., a pin 62, that passes through openings in light body handle pivot member 44 and in handle pivots 314 of handle housing 310 thereby to provide the pivot joint 60 for handle assembly 300 on light body 20. In addition, a torsion spring 316 has one or more coiled parts through which pin 62 passes and has a saddle therebetween that bears against housing 310 and one or more torsion arms that extend radially from the coiled parts thereof to engage handle housing 310 thereby to be under torsion to bias handle housing 310 towards light housing 30 as described.

A spring cap 318 of handle pivot 60 covers parts of torsion spring 316 and has a pair of extensions that extend adjacently to the opposite ends of the coiled parts of spring 316 and that have openings therethrough in which fastener 62 passes through to retain spring cap 318 in position. A washer 62W is placed over the end of fastener 62 opposite the head thereof and the end of fastener is then rolled, swaged, peened or otherwise fastened, e.g., by a cotter pin, snap ring, nut and the like, to retain fastener 62 in position in pivot joint 60.

FIG. 8 is an exploded view of an example switch assembly 500 suitable for use in the example portable light 10. Example switch assembly 500 is disposed in a switch housing 46 which in the example light body 20 is part of forward housing insert 42 that is retained in the forward part 40 of light housing 30 by one or more fasteners 48. Switch assembly 500 transmits pressure (or force) applied to an externally accessible actuator 510, e.g., a flexible boot 510, and the removal of pressure from flexible boot actuator 510, to switch element 570 thereby to actuate and un-actuate switch element 570, whereby a user can press and release flexible boot 510 for controlling the operation of light 10, e.g., turning light source 110 thereof. ON and OFF.

Example switch element 570 typically includes an electronic circuit board 572 on which is mounted an electrical switch 574, e.g., a snap dome switch element 574, that when pressed deforms in shape to make electrical contact with one or more conductors on circuit board 572 and that when released reforms to its undeformed shape to break electrical contact with the one or more conductors on circuit board 572. Snap dome element 574 typically has plural radial legs that may provide, e.g., one normally open electrical contact or two normally open electrical contacts. Switch element 570 is typically seated near the bottom of switch housing 46 and typically below inside housing 530 and has one or more electrical wires connected thereto for connecting switch assembly 500 to other elements of the electrical circuitry of portable light 10.

Elements 520 to 560 of switch assembly 500 are disposed between flexible boot actuator 510 and switch element 570 thereof for transmitting applied and released force (or pressure) from flexible actuator 510 to switch element 570. Plunger 520 has a rectangular upper side that is disposed adjacent to the inside surface of flexible actuator 510 and an opposing side that is adjacent to actuator member 540. Plunger 520 also has one or more coaxial pivot axles 520A that are disposed in compatible pivot receptacles 530A of inner housing 530, whereby plunger 520 is pivotable relative to inner housing 530 in response to force or pressure applied via flexible boot 510. Thus, inward pressure on flexible boot 510 causes plunger 520 to pivot towards switch element 570 and to in turn move actuator member 540, and therefore also spring 550 and button 560, inside inner housing 530 towards switch element 570.

Coil spring 550 compresses under pressure or force applied via flexible boot 510 and pivotable plunger 520 and expands when such pressure or force is removed, thereby to require that flexible boot 510 to move a relatively larger distance to actuate switch element 570 than the relatively smaller distance that is needed to physically actuate and de-actuate switch 574. As a result thereof, a user is provided with a switch action that has a longer throw that is believed to provide a more desirable "tactile feel" to a user operating portable light 10.

Spring 550 is preferably a coil spring 550. An example actuator member 540 therefor may be a cylindrical cap defining an inner recess into which one end of coil spring 550 is disposed and an outer end against which the bottom side of plunger 520 can bear for transmitting force and motion resulting from pressing flexible actuator 510. Example button 560 typically has a cylindrical end which is disposed inside of coil spring 550 and has an annular surface against which the end of coil spring 550 can bear so as to transmit force to switch element 570.

In a typical embodiment, various housings and parts thereof, e.g., parts 26, 30, 40, 42, 120, 130 140, 160, 210, 310, 318, 410 may be a reinforced nylon, engineered nylon, acrylonitrile butadiene styrene (ABS), polycarbonate, polyethylene, or other suitable plastic material, or of a cast, molded or machined metal. Heat sink 150 is preferably a relatively highly thermally conductive material such as aluminum, brass, copper, magnesium, and/or a plastic filled with thermally conductive particles, e.g., a thermally conductive reinforced nylon, engineered nylon, acrylonitrile butadiene styrene (ABS), polycarbonate, polyethylene, or other suitable thermally conductive plastic material, e.g., a plastic that includes (is filled with) thermally conductive particles, flakes, strands or other thermally conductive material, as well as other materials having suitable strength and thermal conductivity. Metal parts, such as clips 22, pins 62, 422, and springs 246, 316, 424, may be of any suitable metal, e.g., aluminum, steel, spring steel, metal wires, brass, bronze, magnesium, beryllium copper, and the like. Resilient and/or flexible parts, such as seals 132, grippers 24, 320, and boot 510, may be of any suitable flexible and/or resilient material, e.g., elastomers, thermoplastic elastomers, silicones, and other suitable materials.

A portable light 10 may comprise: a light body 20 having a cavity for receiving a source of electrical power; a light head 100 including a light source supported on the light head for producing light when energized; a pivot assembly 200 movably coupling the light head to the light body, the pivot assembly including a pivotable joint for pivoting the light head towards and away from the light body and including a rotatable joint for rotating the light head relative to the light body; a handle assembly 300 whereby the portable light may be grasped and carried, the handle assembly including a handle housing that is coupled to the light body by a handle pivot so as to be pivotable away from and toward the light body and a releasable latch assembly that retains the handle housing adjacent the light body; and a switch assembly 500 supported by the light body for selectively coupling the source of electrical power with the light source for energizing the light source to produce light, whereby the light head is both pivotable and rotatable relative to the light body. The pivot assembly may include a pivot block, wherein the pivotable joint couples the pivot block to the light body and wherein the rotatable joint couples the light head to the pivot block. The pivot block may include a detent for resisting movement of the light head from a given position thereof relative to the light body. The handle pivot may be at one end of the handle housing and the releasable latch assembly may be at another end of the handle housing. The releasable latch assembly may include a latch arm that is pivotably mounted to the handle housing, wherein the latch arm has a actuator part and has a releasable engaging feature at an end thereof that engages with and releases from a complementary engaging feature of the light body responsive to the actuator part. The releasable engaging feature of the latch arm may include a latch clasp and the complementary engaging feature of said light body may include a latch clasp that is complementary to the latch clasp of the latch arm. The switch assembly may include a pivotable plunger that is movable by a user to pivot in response to the application and release of a force thereon, to apply and release actuating force on an electrical switch. The switch assembly may include a spring between the pivotable plunger and the electrical switch.

A portable light 10 may comprise: a light body 20 having a cavity for receiving a source of electrical power; a light source 110 supported on the light body for producing light when energized; a handle assembly 300 whereby the portable light may be grasped and carried, the handle assembly including a handle housing that is coupled to the light body by a handle pivot so as to be pivotable away from and toward the light body; a torsion member 60, 316 for biasing the handle housing to pivot towards the light body; a releasable latch assembly 400 that retains the handle housing adjacent the light body when the handle housing is adjacent to the light body; and a switch assembly 500 supported by the light body for selectively coupling the source of electrical power with the light source for energizing the light source to produce light. The handle pivot may be near one end of the handle housing and the releasable latch assembly may be near another end of the handle housing. The releasable latch assembly may include a latch arm that is pivotably mounted to the handle housing, wherein the latch arm has a actuator part and has a releasable engaging feature at an end thereof that engages with and releases from a complementary engaging feature of the light body responsive to the actuator part. The releasable engaging feature of the latch arm may include a latch clasp and the complementary engaging feature of the light body may include latch clasp that is complementary to the latch clasp of the latch arm. The light source may be supported by a light head that is movable relative to the light body. The light head 100 may comprise: a pivot assembly movably coupling the light head to the light body, the pivot assembly including a pivotable joint for pivoting the light head towards and away from the light body and including a rotatable joint for rotating the light head relative to the light body, whereby the light head is both pivotable and rotatable relative to the light body. The pivot assembly may include a pivot block, wherein the pivotable joint couples the pivot block to the light body and wherein the rotatable joint couples the light head to the pivot block. The pivot block may include a detent for resisting movement of the light head from a given position thereof relative to the light body. The switch assembly may include a pivotable plunger that is movable by a user to pivot in response to the application and release of a force thereon, to apply and release actuating force on an electrical switch. The switch assembly may include a spring between the pivotable plunger and the electrical switch.

A portable light 10 comprising: a light body 20 having a cavity for receiving a source of electrical power; a light head 100 movably supported on the light body and including a light source for producing light when energized; a handle assembly 300 whereby the portable light may be grasped and carried, the handle assembly including a handle housing that is coupled to the light body by a handle pivot so as to be pivotable away from and toward the light body; and a torsion member 60, 316 for biasing the handle housing to pivot towards the light body; a switch assembly 500 supported by the light body for selectively coupling the source of electrical power with the light source for energizing the light source to produce light, whereby the light head is movable relative to the light body. The light head 100 may further comprise: a pivot assembly movably coupling the light head to the light body, the pivot assembly including a pivotable joint for pivoting the light head towards and away from the light body and including a rotatable joint for rotating the light head relative to the light body, whereby the light head is both pivotable and rotatable relative to the light body. The pivot assembly may include a pivot block, wherein the pivotable joint couples the pivot block to the light body and wherein the rotatable joint couples the light head to the pivot block. The pivot block may include a detent for resisting movement of the light head from a given position thereof relative to the light body. The portable light 10 may further include: a releasable latch assembly that retains the handle housing adjacent the light body when the handle housing is adjacent to the light body. The releasable latch assembly may include a latch arm that is pivotably mounted to the handle housing and wherein the latch arm has a actuator part and has a releasable engaging feature at an end thereof that engages with and releases from a complementary engaging feature of the light body responsive to the actuator part. The handle pivot may be at one end of the handle housing and the releasable latch assembly may be at another end of the handle housing. The switch assembly may include a pivotable plunger that is movable by a user to pivot in response to the application and release of a force thereon, to apply and release actuating force on an electrical switch. The switch assembly may include a spring between the pivotable plunger and the electrical switch.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." Likewise, a phrase in the form "A, B and/or C" or a phrase in the form "A and/or B and/or C" includes "A," "B," "C," "A and B," "A and C," "B and C," and "A and B and C." In addition, the term "at least one of" one or more elements is intended to include one of any one of the elements, more than one of any of the elements, and two or more of the elements up to and including all of the elements, and so, e.g., phrases in the form "at least one of A, B and C" include "A," "B," "C," "A and B," "A and C," "B and C," and "A and B and C."

As used herein, the term "predetermined" means determined in advance and while that may include a fixed value, position, condition and/or limit, predetermined is not limited to a fixed value, position, condition and/or limit. A predetermined value, position, condition and/or limit may change or otherwise vary over time, over a sequence and/or over a randomized series of values, positions, conditions and/or limits.

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof are not intended to be exact synonyms, but to encompass some similar things and some different things. The term "connected" may be used generally to refer to elements that have a direct electrical and/or physical contact to each other, whereas the term "coupled" may be used generally to refer to elements that have an indirect electrical and/or physical contact with each other, e.g., via one or more intermediate elements, so as to cooperate and/or interact with each other, and may include elements in direct contact as well.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could include power sources including, but not limited to, fuel cells, super capacitors, solar cells, and the like. Any of the foregoing may be intended for a single use or for being rechargeable or for both, and/or plural ones thereof may be combined into a battery pack or battery assembly.

While the present invention has been described in terms of the foregoing example embodiments, variations within the scope and spirit of the present invention as defined by the claims following will be apparent to those skilled in the art. For example, while the illustrated light head is pivotable and rotatable at its upper end, the light head can be configured to be pivotable and/or rotatable at its lower or bottom end, or at either side thereof.

Similarly, the example pivotable handle 300 is pivoted at its forward end and has a latch at its rearward end, however, a pivotable handle can be pivoted at its rearward end and configured to have a latch at its forward end, if desired.

While example latch assembly 400 is supported on the handle assembly 300 and engages a latch clasp on the light body 20, a latch assembly can be provided on the light body and configured to engage a latch clasp on the handle of the light, if desired.

While certain features may be described as a raised feature, e.g., a ridge, boss, flange, projection, detent, or other raised feature, such feature may be positively formed or may be what remains after a recessed feature, e.g., a groove, slot, hole, indentation, recess, detent, or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made. In addition, where a raised feature engages a recessed feature, such as a cylindrical projection that engages a complementary receptacle, the relative positions of the raised and recessed features may be interchanged or other wise modified.

Each of the U.S. Provisional applications, U.S. patent applications, and/or U.S. patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light comprising:
a light body having a cavity for receiving a source of electrical power;
a light head supported on said light body and including a light source for producing light when energized;
a pivot assembly movably coupling said light head to said light body, said pivot assembly including a pivotable joint for pivoting said light head towards and away from said light body and including a rotatable joint for rotating said light head relative to said light body;
a handle assembly whereby said portable light may be grasped and carried, said handle assembly including a handle housing that is coupled to said light body by a handle pivot so as to be pivotable away from and toward said light body and a releasable latch assembly that retains the handle housing adjacent said light body; and
a switch assembly supported by said light body for selectively coupling the source of electrical power with said light source for energizing said light source to produce light,
whereby said light head is both pivotable and rotatable relative to said light body.

2. The portable light of claim 1 wherein said pivot assembly includes a pivot block, wherein the pivotable joint couples said pivot block to said light body and wherein the rotatable joint couples said light head to said pivot block.

3. The portable light of claim 2 wherein said pivot block includes a detent for resisting movement of said light head from a given position thereof relative to said light body.

4. The portable light of claim 1 wherein the handle pivot is at one end of said handle housing and wherein the releasable latch assembly is at another end of said handle housing.

5. The portable light of claim 1 wherein the releasable latch assembly includes a latch arm that is pivotably mounted to said handle housing and wherein the latch arm has a actuator part and has a releasable engaging feature at an end thereof that engages with and releases from a complementary engaging feature of said light body responsive to the actuator part.

6. The portable light of claim 5 wherein the releasable engaging feature of the latch arm includes a latch clasp and the complementary engaging feature of said light body includes a latch clasp that is complementary to the latch clasp of the latch arm.

7. The portable light of claim 1 wherein said switch assembly includes a pivotable plunger that is movable by a user to pivot in response to the application and release of a force thereon, to apply and release actuating force on an electrical switch.

8. The portable light of claim 7 wherein said switch assembly includes a spring between the pivotable plunger and the electrical switch.

9. A portable light comprising:
a light body having a cavity for receiving a source of electrical power;
a light source supported on said light body for producing light when energized;
a handle assembly whereby said portable light may be grasped and carried, said handle assembly including a handle housing that is coupled to said light body by a handle pivot so as to be pivotable away from and toward said light body;
a torsion member for biasing said handle housing to pivot towards said light body;
a releasable latch assembly that retains the handle housing adjacent said light body when the handle housing is adjacent to said light body; and
a switch assembly supported by said light body for selectively coupling the source of electrical power with said light source for energizing said light source to produce light.

10. The portable light of claim 9 wherein the handle pivot is near one end of said handle housing and wherein the releasable latch assembly is near another end of said handle housing.

11. The portable light of claim 9 wherein the releasable latch assembly includes a latch arm that is pivotably mounted to said handle housing and wherein the latch arm has a actuator part and has a releasable engaging feature at an end thereof that engages with and releases from a complementary engaging feature of said light body responsive to the actuator part.

12. The portable light of claim 11 wherein the releasable engaging feature of the latch arm includes a latch clasp and the complementary engaging feature of said light body includes latch clasp that is complementary to the latch clasp of the latch arm.

13. The portable light of claim 9 wherein the light source is supported by a light head that is movable relative to said light body.

14. The portable light of claim 13 wherein said light head comprises: a pivot assembly movably coupling said light head to said light body, said pivot assembly including a pivotable joint for pivoting said light head towards and away from said light body and including a rotatable joint for rotating said light head relative to said light body, whereby said light head is both pivotable and rotatable relative to said light body.

15. The portable light of claim 14 wherein said pivot assembly includes a pivot block, wherein the pivotable joint couples said pivot block to said light body and wherein the rotatable joint couples said light head to said pivot block.

16. The portable light of claim 15 wherein said pivot block includes a detent for resisting movement of said light head from a given position thereof relative to said light body.

17. The portable light of claim 9 wherein said switch assembly includes a pivotable plunger that is movable by a user to pivot in response to the application and release of a force thereon, to apply and release actuating force on an electrical switch.

18. The portable light of claim 17 wherein said switch assembly includes a spring between the pivotable plunger and the electrical switch.

19. A portable light comprising:
a light body having a cavity for receiving a source of electrical power;

a light head movably supported on said light body and including a light source for producing light when energized;

a handle assembly whereby said portable light may be grasped and carried, said handle assembly including a handle housing that is coupled to said light body by a handle pivot so as to be pivotable away from and toward said light body; and a torsion member for biasing said handle housing to pivot towards said light body;

a switch assembly supported by said light body for selectively coupling the source of electrical power with said light source for energizing said light source to produce light, whereby said light head is movable relative to said light body.

20. The portable light of claim 19 wherein said light head further comprises: a pivot assembly movably coupling said light head to said light body, said pivot assembly including a pivotable joint for pivoting said light head towards and away from said light body and including a rotatable joint for rotating said light head relative to said light body, whereby said light head is both pivotable and rotatable relative to said light body.

21. The portable light of claim 20 wherein said pivot assembly includes a pivot block, wherein the pivotable joint couples said pivot block to said light body and wherein the rotatable joint couples said light head to said pivot block.

22. The portable light of claim 21 wherein said pivot block includes a detent for resisting movement of said light head from a given position thereof relative to said light body.

23. The portable light of claim 19 further including: a releasable latch assembly that retains the handle housing adjacent said light body when the handle housing is adjacent to said light body.

24. The portable light of claim 23 wherein the releasable latch assembly includes a latch arm that is pivotably mounted to said handle housing and wherein the latch arm has a actuator part and has a releasable engaging feature at an end thereof that engages with and releases from a complementary engaging feature of said light body responsive to the actuator part.

25. The portable light of claim 19 wherein the handle pivot is at one end of said handle housing and wherein the releasable latch assembly is at another end of said handle housing.

26. The portable light of claim 19 wherein said switch assembly includes a pivotable plunger that is movable by a user to pivot in response to the application and release of a force thereon, to apply and release actuating force on an electrical switch.

27. The portable light of claim 26 wherein said switch assembly includes a spring between the pivotable plunger and the electrical switch.

* * * * *